(12) United States Patent
Keeble et al.

(10) Patent No.: US 11,678,613 B2
(45) Date of Patent: Jun. 20, 2023

(54) RAILING MOUNTABLE HORTICULTURAL CONTAINER

(71) Applicant: THE HC COMPANIES, INC., Twinsburg, OH (US)

(72) Inventors: Drew Keeble, Twinsburg, OH (US); Mark Wilkinson, Twinsburg, OH (US)

(73) Assignee: THE HC COMPANIES, INC., Twinsburg, OH (US)

( * ) Notice: Subject to any disclaimer, the term of this patent is extended or adjusted under 35 U.S.C. 154(b) by 57 days.

(21) Appl. No.: 17/173,522

(22) Filed: Feb. 11, 2021

(65) Prior Publication Data
US 2021/0251154 A1    Aug. 19, 2021

Related U.S. Application Data

(60) Provisional application No. 62/976,748, filed on Feb. 14, 2020.

(51) Int. Cl.
*A01G 9/02*    (2018.01)

(52) U.S. Cl.
CPC ..................................... *A01G 9/02* (2013.01)

(58) Field of Classification Search
CPC .......... A01G 9/28; A01G 9/024; A01G 9/027; A47G 7/044; A47H 27/00
USPC .............................. 248/228.5, 230.5, 231.61
See application file for complete search history.

(56) References Cited

U.S. PATENT DOCUMENTS

| | | |
|---|---|---|
| 1,690,910 A | 11/1928 | Shapiro |
| 3,993,192 A * | 11/1976 | Bunn ........................ F16L 1/06 220/23.8 |
| 4,559,738 A | 12/1985 | Helfman |
| 4,640,045 A * | 2/1987 | Nesbitt .................... A01G 9/04 47/41.01 |
| D296,088 S | 6/1988 | Pouliot |
| D296,089 S | 6/1988 | Pouliot |
| 5,240,214 A | 8/1993 | Birnbaum |
| D340,204 S | 10/1993 | Grosfillex |
| D367,243 S | 2/1996 | McAllister |
| D385,213 S | 10/1997 | McAllister |
| D394,827 S | 6/1998 | Ruthenberg |
| D532,715 S | 11/2006 | Schmidt |
| D571,688 S | 6/2008 | White |
| D578,929 S | 10/2008 | White |
| D578,930 S | 10/2008 | White |
| 8,312,674 B2 | 11/2012 | Adams |
| D710,245 S | 8/2014 | Mast |
| D711,210 S | 8/2014 | Gentry |
| 9,003,700 B2 | 4/2015 | Kumar |
| D819,490 S | 6/2018 | Ryan |

(Continued)

FOREIGN PATENT DOCUMENTS

| | | |
|---|---|---|
| CN | 102986471 A | 3/2013 |
| DE | 2920155 A1 | 11/1980 |

(Continued)

*Primary Examiner* — Joshua D Huson
*Assistant Examiner* — Katherine Anne Kloecker
(74) *Attorney, Agent, or Firm* — Tucker Ellis LLP

(57) ABSTRACT

A horticultural container for attaching to a railing, including a planter body, at least one leg extending downward from the planter body, and a connecting device. The planter body rests on top of the top rail of the railing, while the legs straddle the top rail. The connecting device attaches to each leg below the top rail, and receives balusters of the railing.

20 Claims, 42 Drawing Sheets

(56) References Cited

U.S. PATENT DOCUMENTS

| | | |
|---|---|---|
| D820,149 S | 6/2018 | Tao |
| D821,258 S | 6/2018 | Tao |
| D823,158 S | 7/2018 | Ryan |
| D840,264 S | 2/2019 | Ryan |
| 10,292,344 B2 | 5/2019 | Flores Garcia |
| D864,020 S | 10/2019 | Batito |
| D911,215 S | 2/2021 | Wang |
| 11,299,862 B1 * | 4/2022 | Merriam ............... A01G 9/28 |
| 2015/0000189 A1 | 1/2015 | Greis-Avnon |
| 2016/0353877 A1 * | 12/2016 | Brus ..................... A47B 5/02 |
| 2020/0267910 A1 * | 8/2020 | Wilson ................. A01G 9/027 |
| 2021/0251154 A1 | 8/2021 | Keeble et al. |

FOREIGN PATENT DOCUMENTS

| | | | | |
|---|---|---|---|---|
| EM | 001653478-0001 S | 8/2010 | | |
| EM | 001653478-0002 S | 8/2010 | | |
| EP | 1198984 A2 * | 4/2002 | ............ | A01G 9/02 |
| FR | 3070821 B1 * | 1/2020 | ............ | A01G 9/022 |
| GB | 2434292 A * | 7/2007 | ............ | A01G 9/022 |

\* cited by examiner

RAILING MOUNTABLE HORTICULTURAL CONTAINER

RELATED APPLICATIONS

This application claims the benefits of U.S. Provisional Application No. 62/976,748 filed Feb. 14, 2020, which is incorporated herein by reference in its entirety.

FIELD OF INVENTION

The present disclosure relates generally to horticultural containers, and more particularly to horticultural containers that may be secured over a railing.

BACKGROUND

Plants are often planted outside in horticultural containers, such as planters and hanging baskets. Users of horticultural containers often like to place planters in aesthetically strategic places, which might include over outdoor railings. But this is a difficult location to secure a planter since the planter is often wider than the top rail of the railing.

SUMMARY OF INVENTION

The present application discloses a horticultural container having a general shape and design to be secured over a railing. The container has an open top, two legs, and a connecting device connecting the two legs to secure the container to the railing. Each leg extends downward from the container, where the legs are spaced and shaped to be located on either side of a top rail of the railing. The connecting device attaches to a bottom of each of the legs, while strategically interacting with balusters of the railing to assist in securing the container to the railing. The connecting device also may act as a saucer for the container and/or allow for self-watering of a plant inside the container.

According to an aspect, a horticultural container assembly is provided that comprises a planter body defining a chamber, wherein the planter body has an open top, a first leg and a second leg, each extending downward from the planter body, and spaced and shaped to straddle a top rail of a railing, and a connecting device configured to attach to each of the first and second legs by extending through a passage between adjacent balusters of the railing.

According to one embodiment of the horticultural container, the planter body has four sides.

According to another embodiment of the horticultural container, the planter body is further comprised of a stepped bottom surface that accommodates different sizes and shapes of the top rail of the railing.

According to another embodiment of the horticultural container, the planter body, first leg, and second leg are monolithic.

According to another embodiment of the horticultural container, the first leg and second leg are hollow.

According to another embodiment of the horticultural container, the hollow legs combine with the planter body to form an interior volume of the horticultural container.

According to another embodiment of the horticultural container, the connecting device comprises arms configured to trap at least one baluster of the railing between the arms.

According to another embodiment of the horticultural container, at least one of a growing medium or a plant located within the chamber.

According to another embodiment of the horticultural container, the distance between the first and second legs is spaced to fit both a top rail and a top of a baluster.

According to another embodiment of the horticultural container, the connecting device is continuous from the first leg to the second leg.

According to another embodiment of the horticultural container, the connecting device is separable from the first leg and the second leg.

According to another embodiment of the horticultural container, the connecting device is connected to the first leg and the second leg by snap fit, friction fit, interference fit, or fastenerless connection.

According to another embodiment of the horticultural container, the connecting device has a longitudinal axis, and is comprised of at least a first arm and a second arm, wherein the first and second arms are interconnected by a member traversing the longitudinal axis.

According to another embodiment of the horticultural container, the first arm, the second arm, and the member are monolithic.

According to another embodiment of the horticultural container, the first and second arms are spaced to receive at least one baluster of the railing therebetween, and form at least one notch with the member traversing the longitudinal axis.

According to another embodiment of the horticultural container, the first arm is perpendicularly connected to a first side of the member, and the second arm is perpendicularly connect to a second side of the member.

According to another embodiment of the horticultural container, the connecting device comprises a water reservoir with an open top fluidly connected with the chamber of the planter body.

According to another embodiment of the horticultural container, the first leg and second leg have holes at a bottom end of each respective leg, the connecting device is capable of holding liquid, and the liquid is capable of passing from the connecting device into the first and second leg through the holes at the bottom of each leg.

According to another embodiment of the horticultural container, the connecting device has a dimensionally fixed configuration.

According to another embodiment of the horticultural container, a method of connecting a horticulture container assembly to a railing comprising steps of placing a planter body along a longitudinal axis of a top rail of a railing, orienting a connecting device to fit between two balusters of the railing, orienting the connecting device to straddle at least one baluster, and connecting the connecting device to the planter body by at least two points that are respectively located on opposite sides of the baluster that are on opposing sides of the longitudinal axis.

According to another embodiment of the horticultural container, a method of connecting a horticultural container assembly to a railing comprises filling the connecting device with water to facilitate self-watering of a plant retained by the planter body.

The foregoing and other features of the application are described below with reference to the drawings.

DETAILED DESCRIPTION

Figure 1:
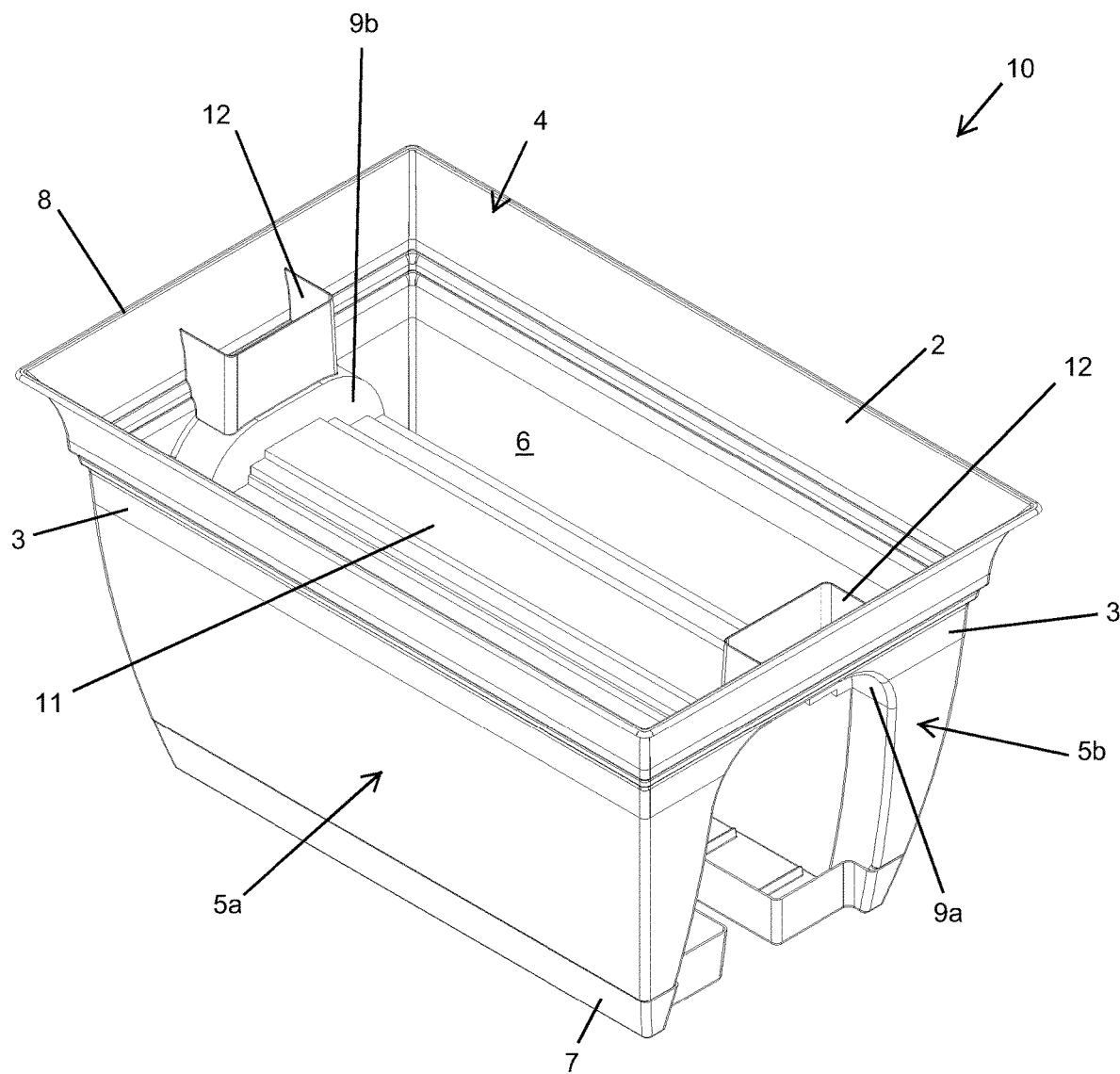
FIG. 1 is a perspective view of an exemplary embodiment of the horticultural container.
Figure 2:
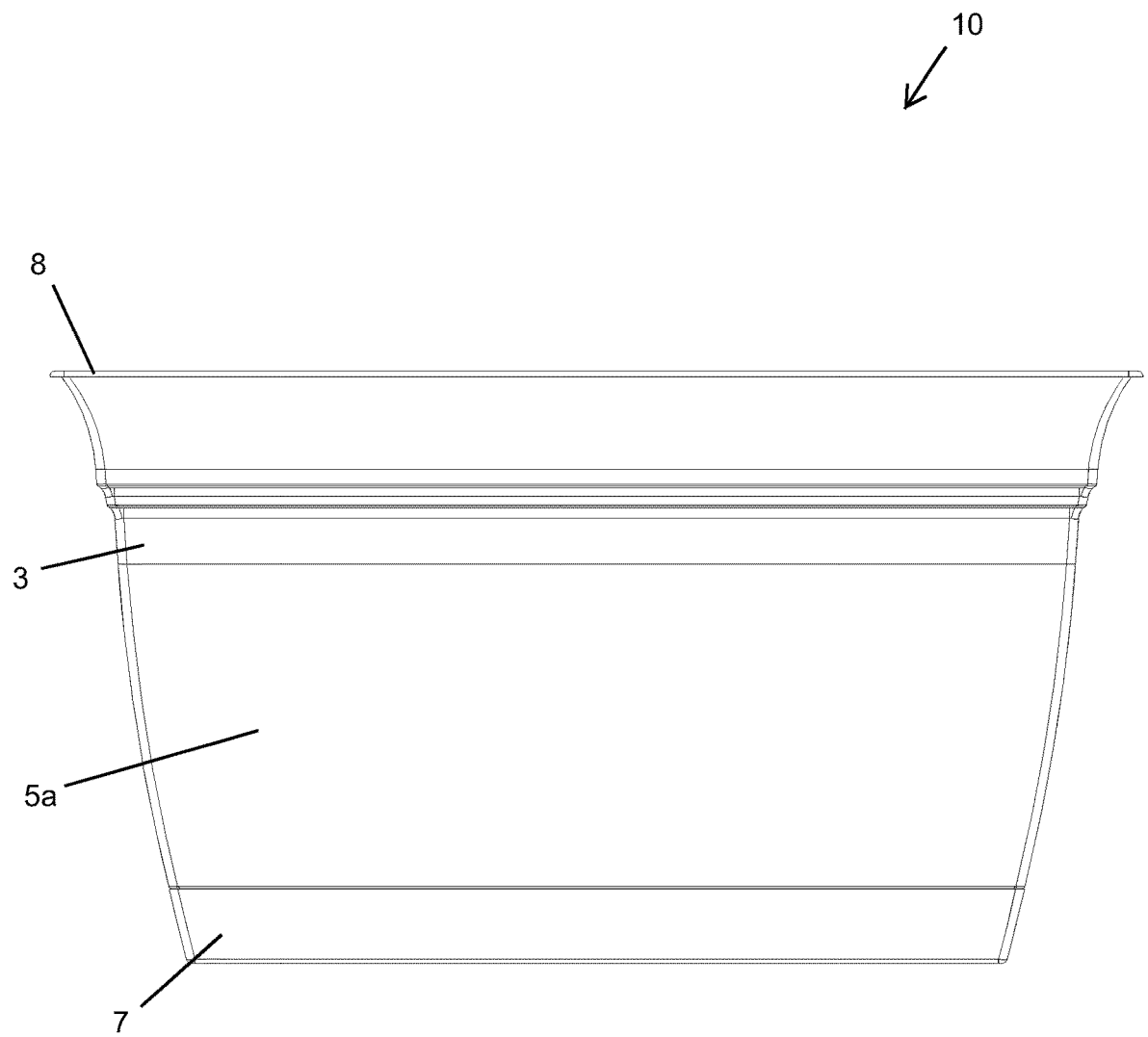
FIG. 2 is a front view of the horticultural container, the rear view being a mirror image thereof.
Figure 3:
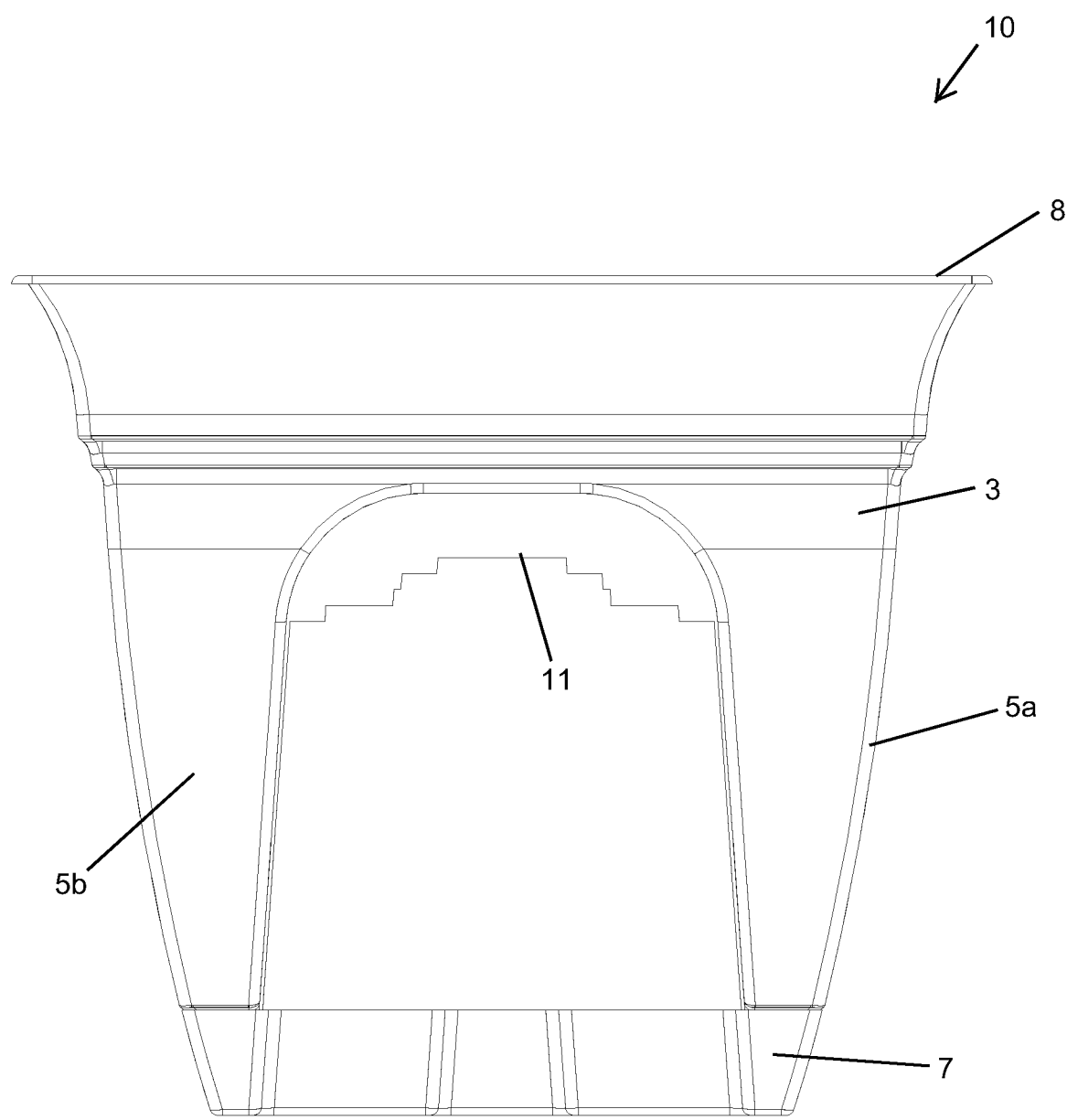
FIG. 3 is a left side view of the horticultural container, the right side view being a mirror image thereof.
Figure 4:
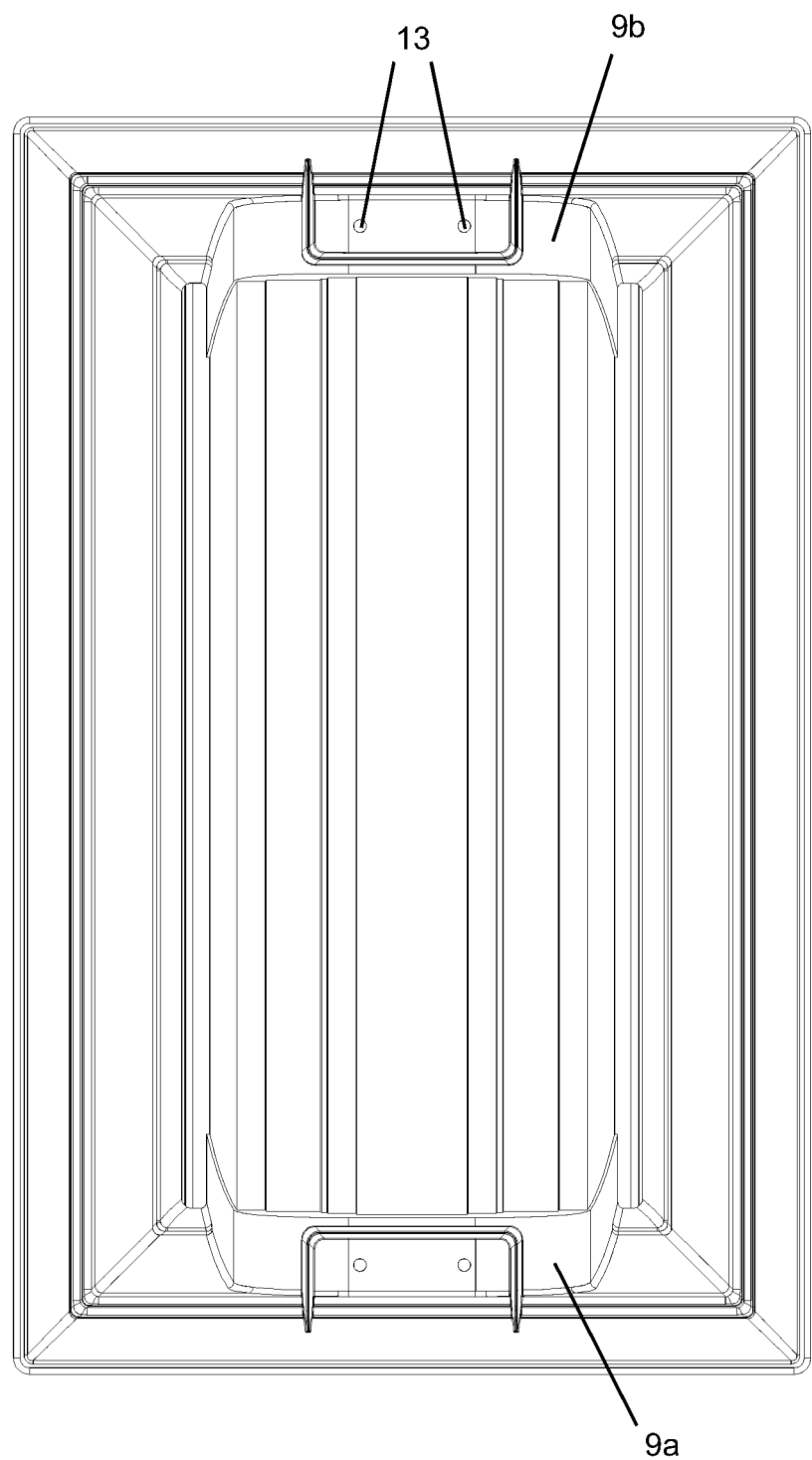
FIG. 4 is a top view of the horticultural container.
Figure 5:
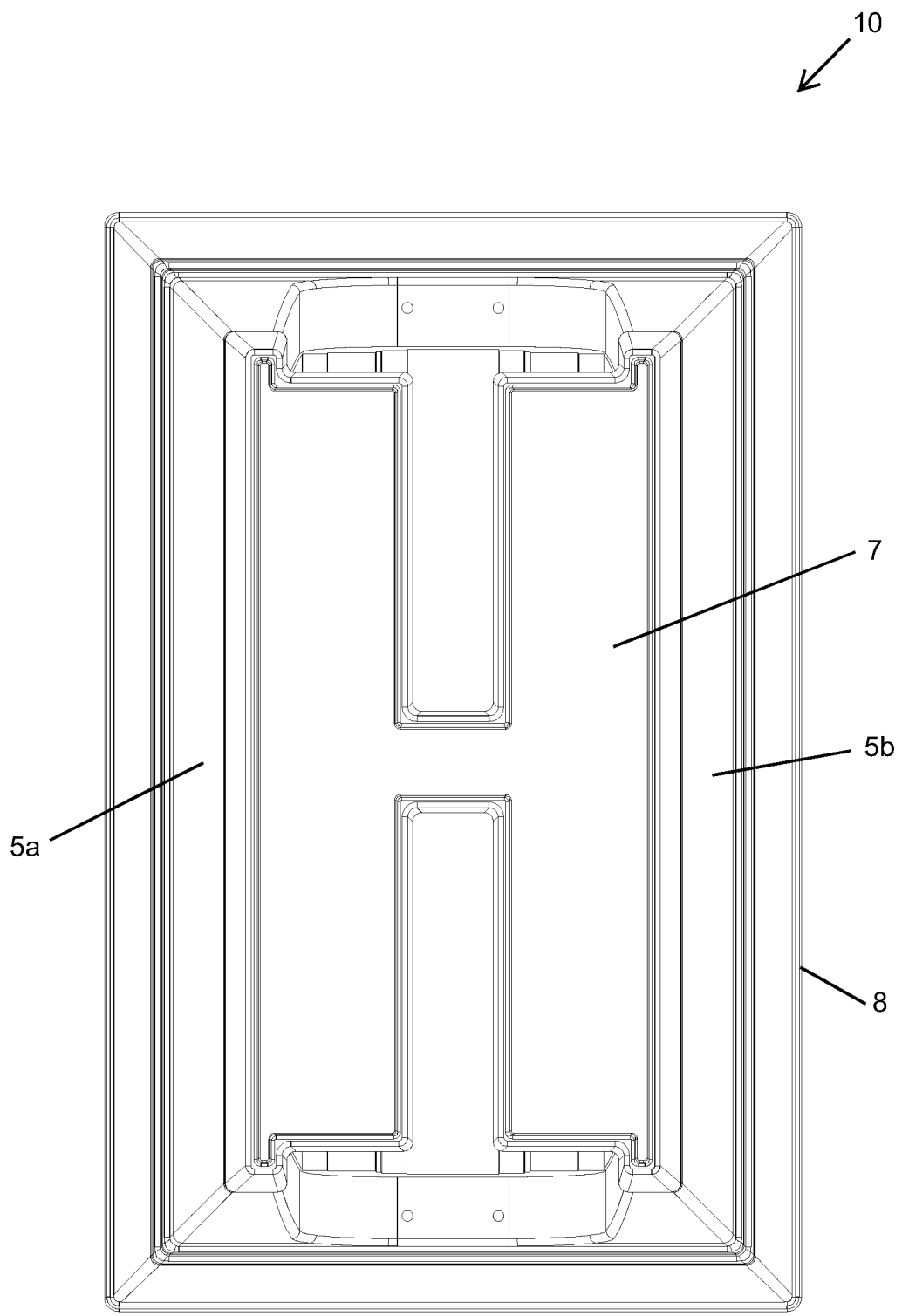
FIG. 5 is a bottom view of the horticultural container.
Figure 6:
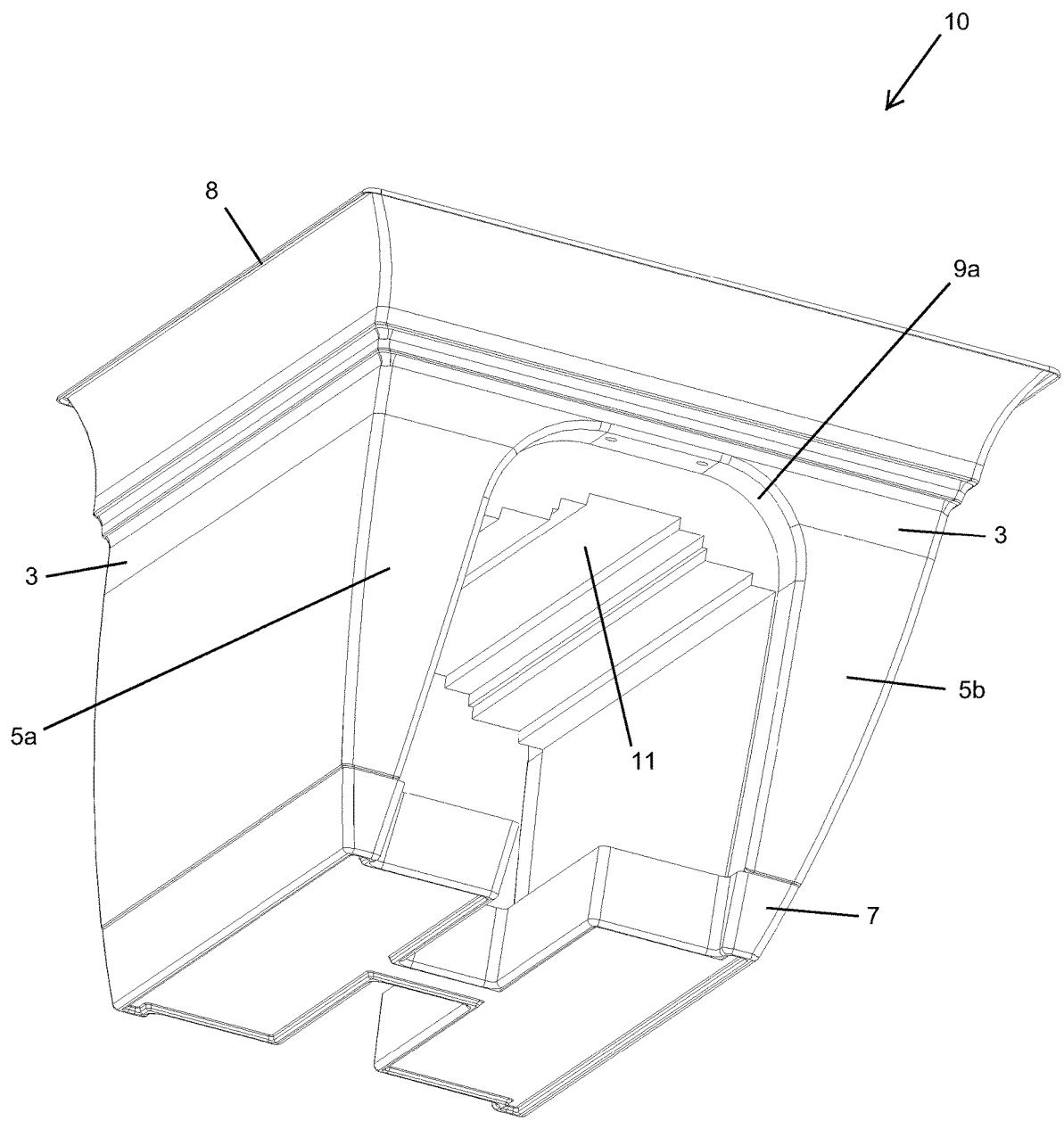
FIG. 6 is a perspective view of another embodiment of the horticultural container.
Figure 7:
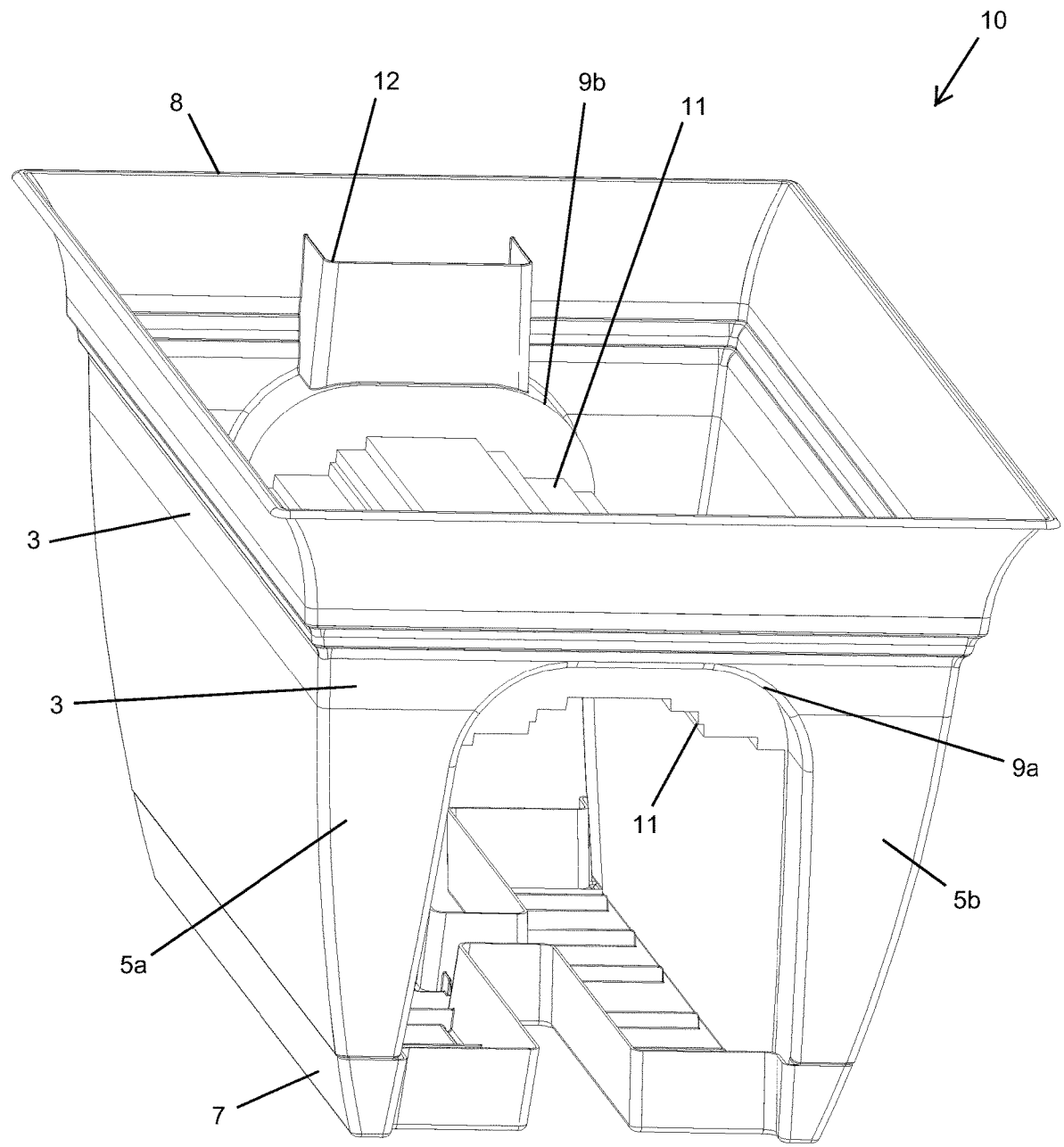
FIG. 7 is a perspective view of the horticultural container.
Figure 8:
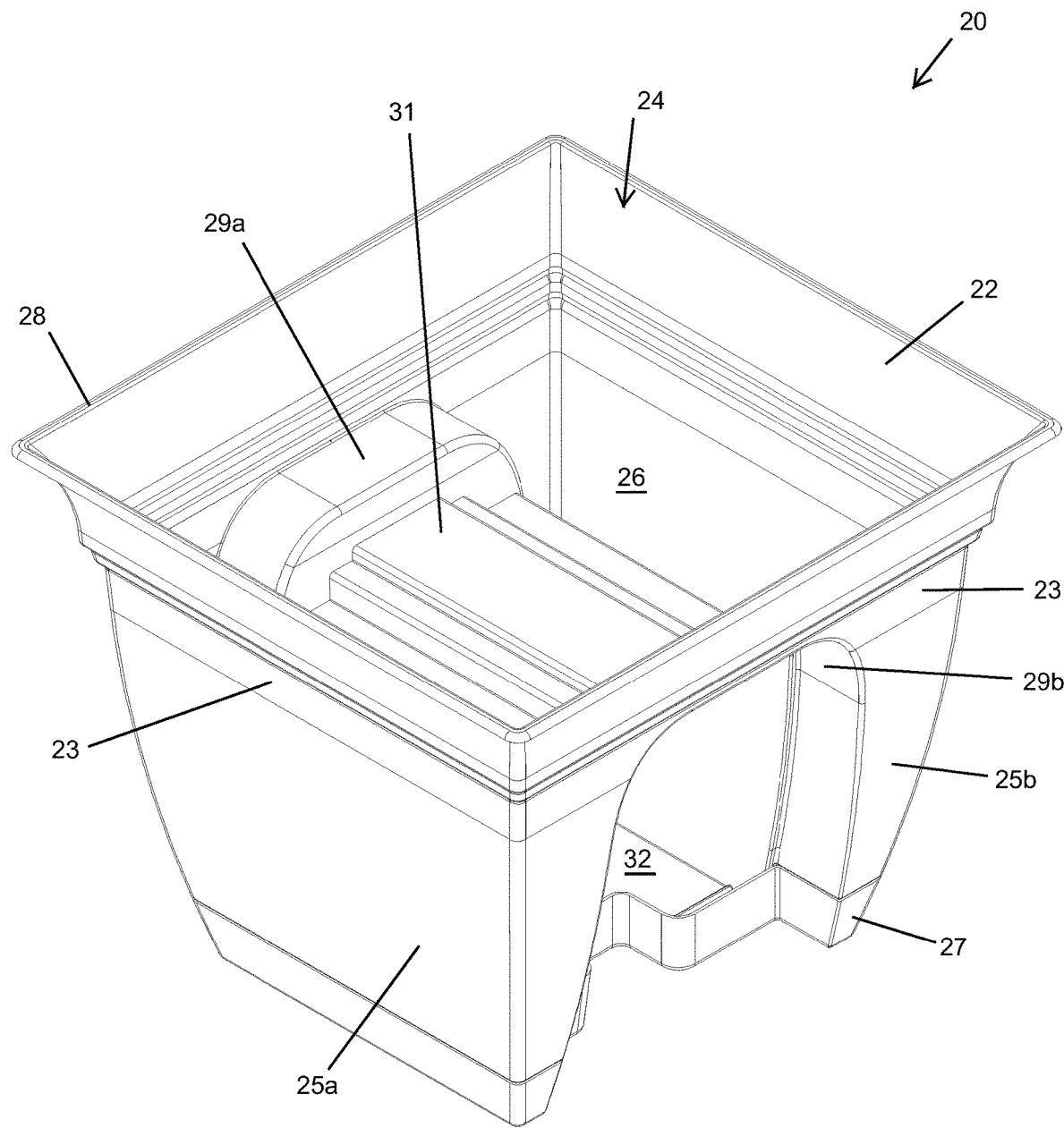
FIG. 8 is a perspective view of an exemplary horticultural container.
Figure 9:
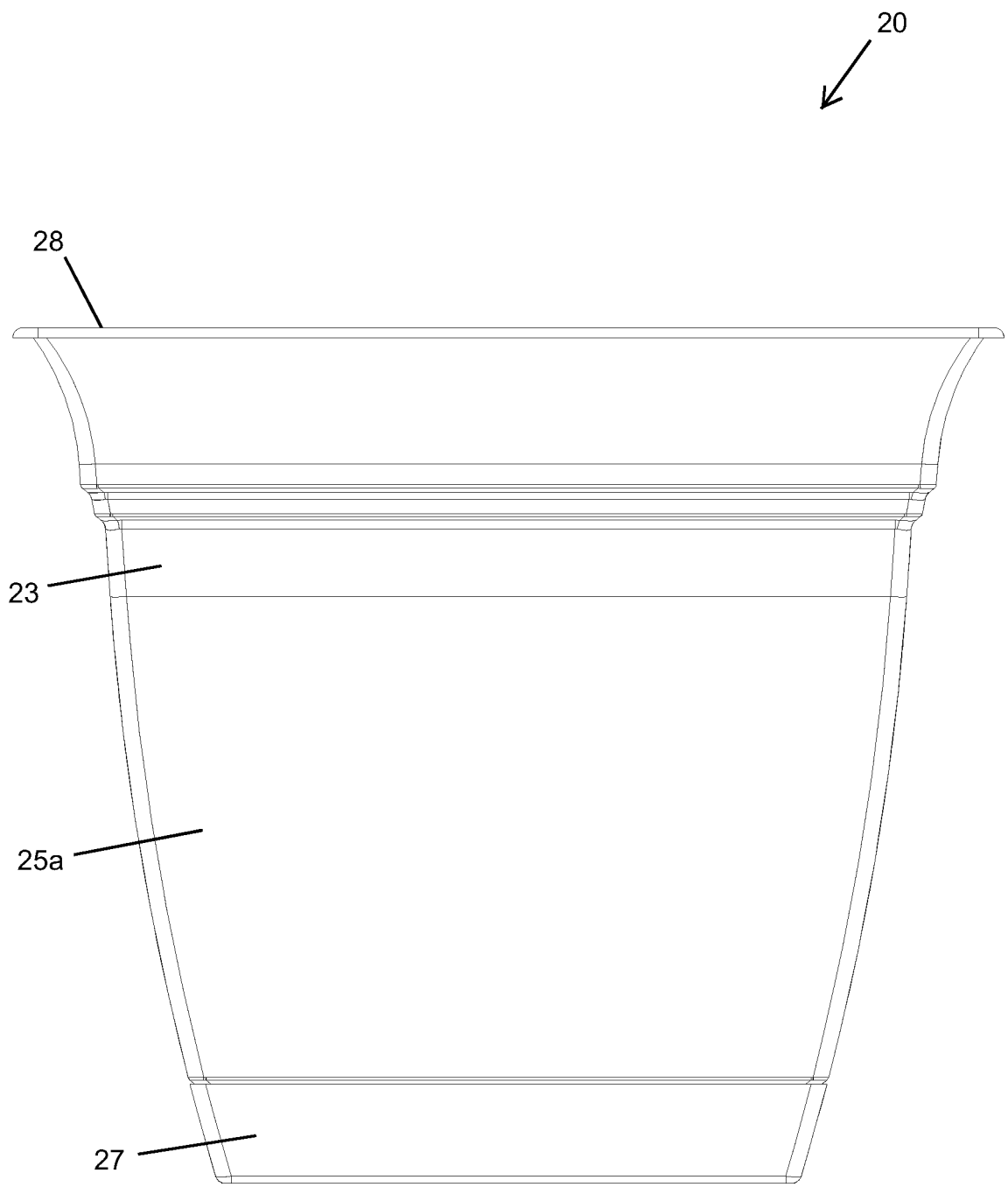
FIG. 9 is a front view of the horticultural container, the rear view being a mirror image thereof.
Figure 10:
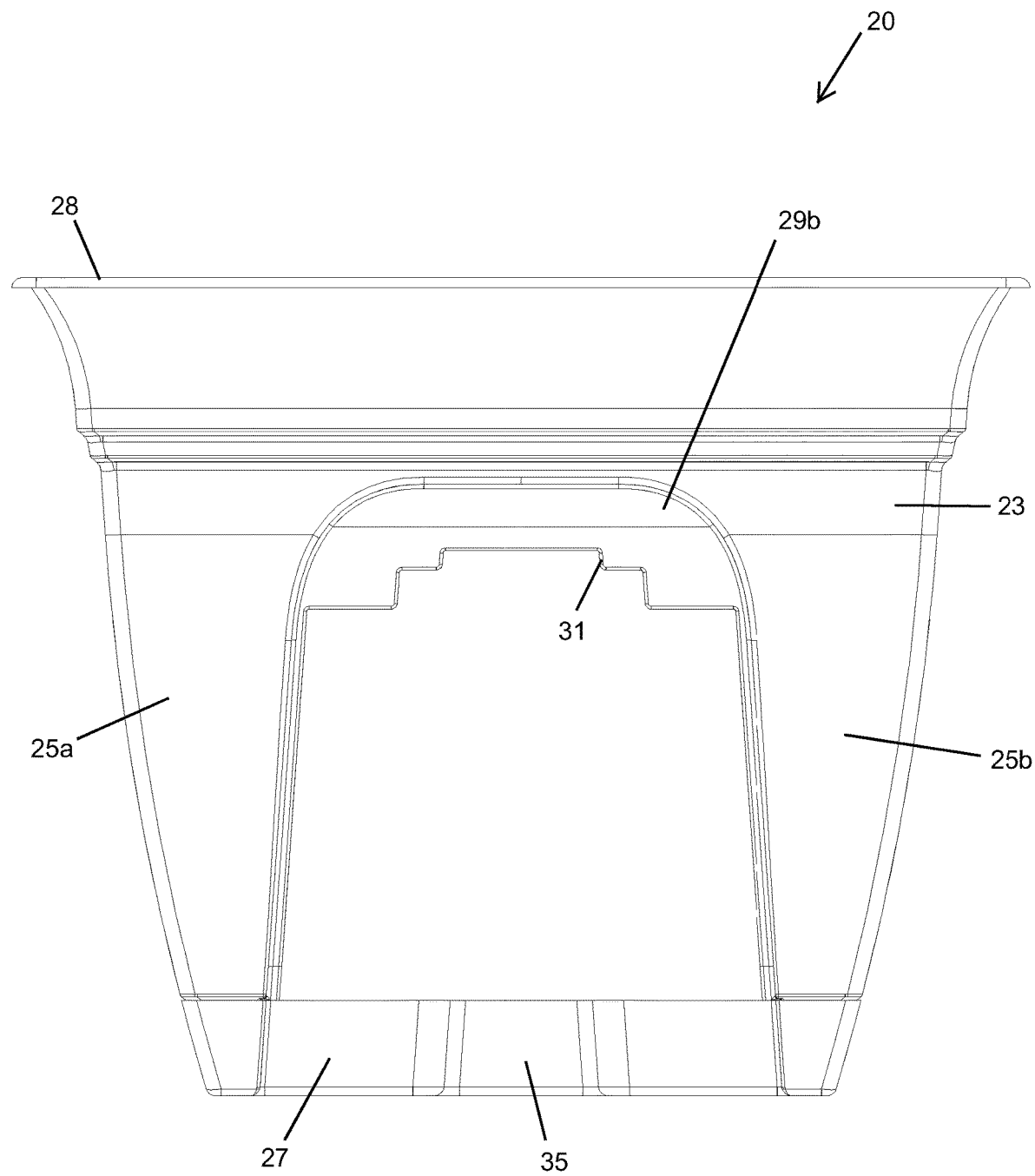
FIG. 10 is a left side view of the horticultural container, the right side view being a mirror image thereof.
Figure 11:
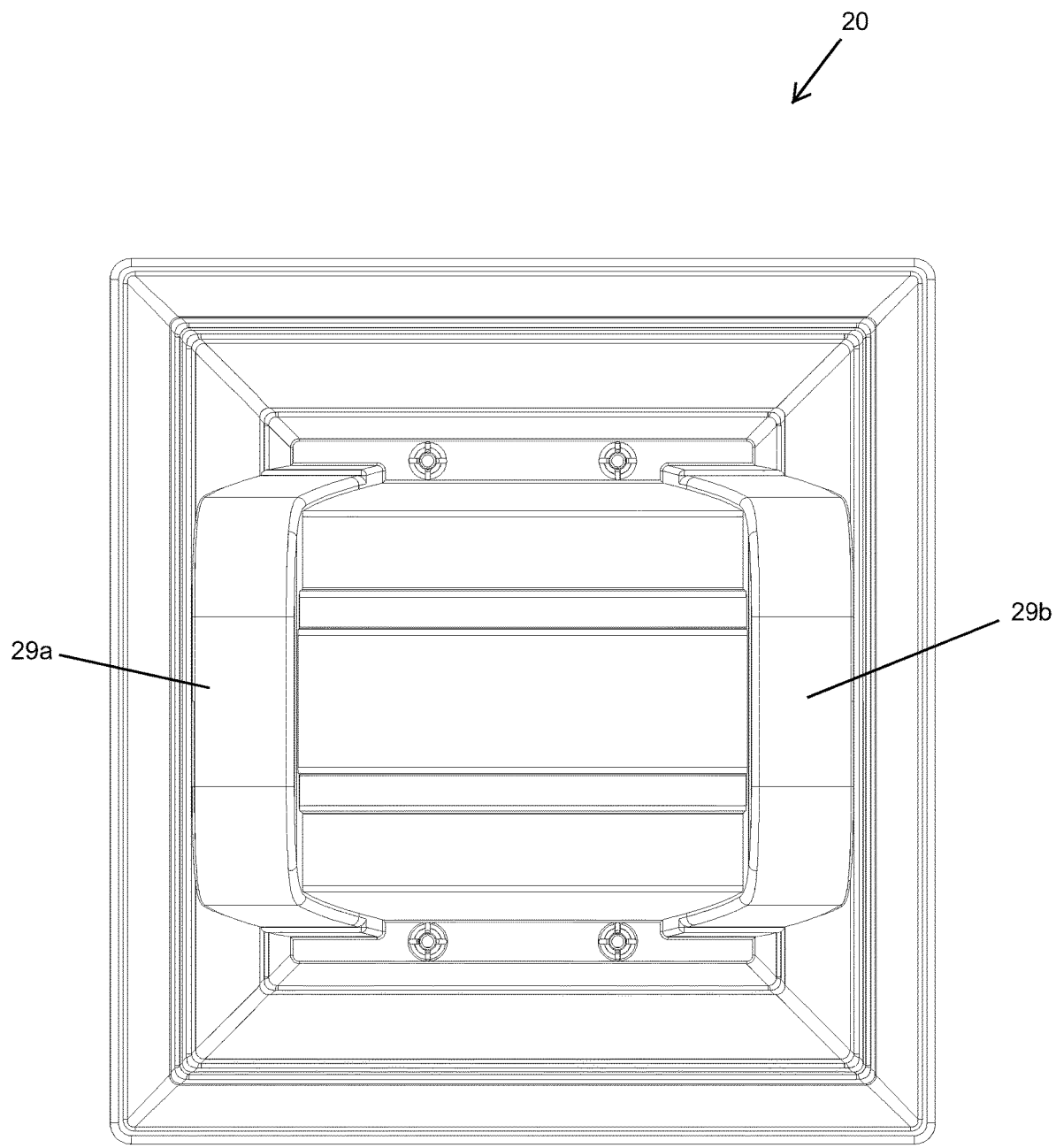
FIG. 11 is a top view of the horticultural container.
Figure 12:
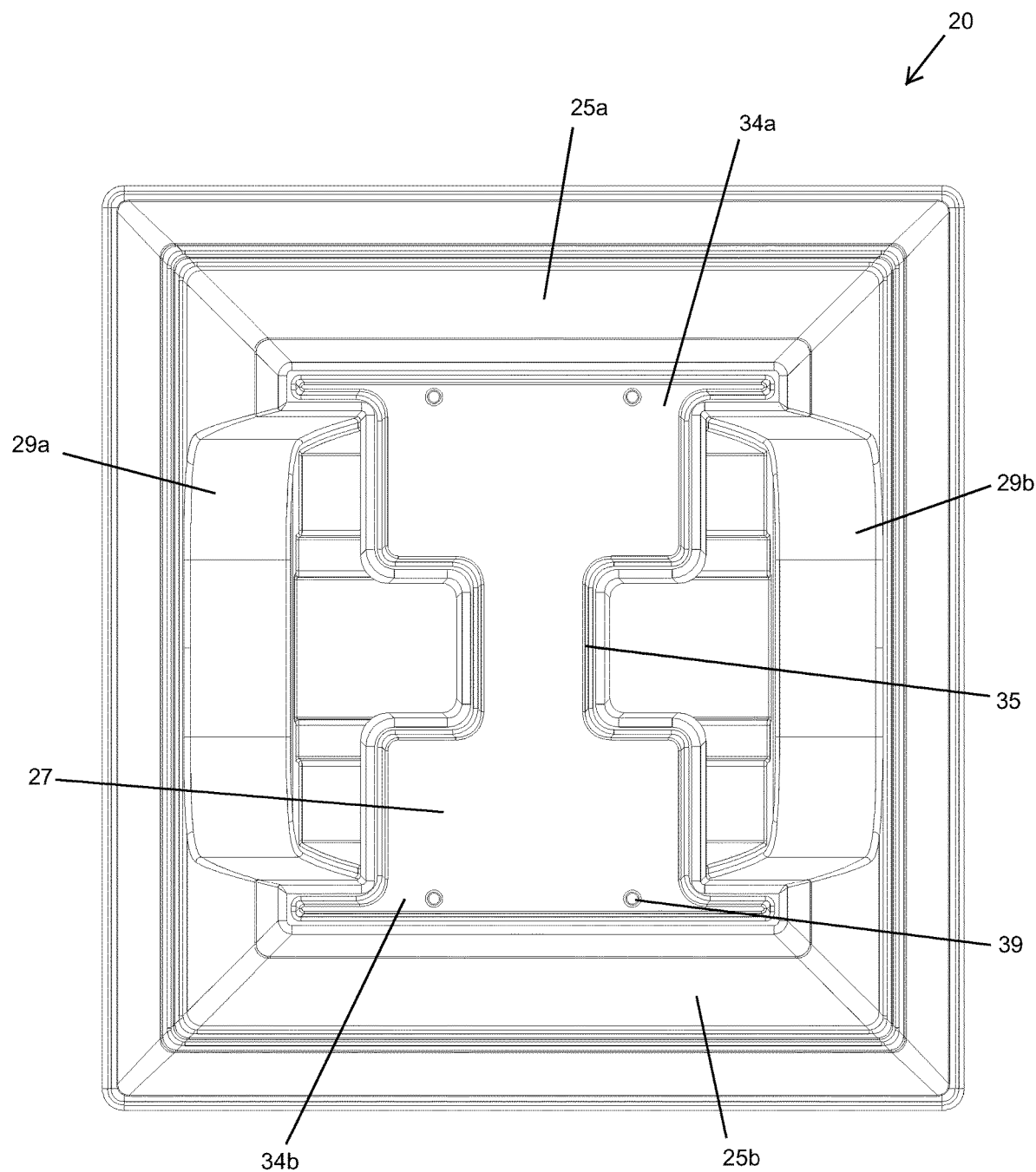
FIG. 12 is a bottom view of the horticultural container.
Figure 13:
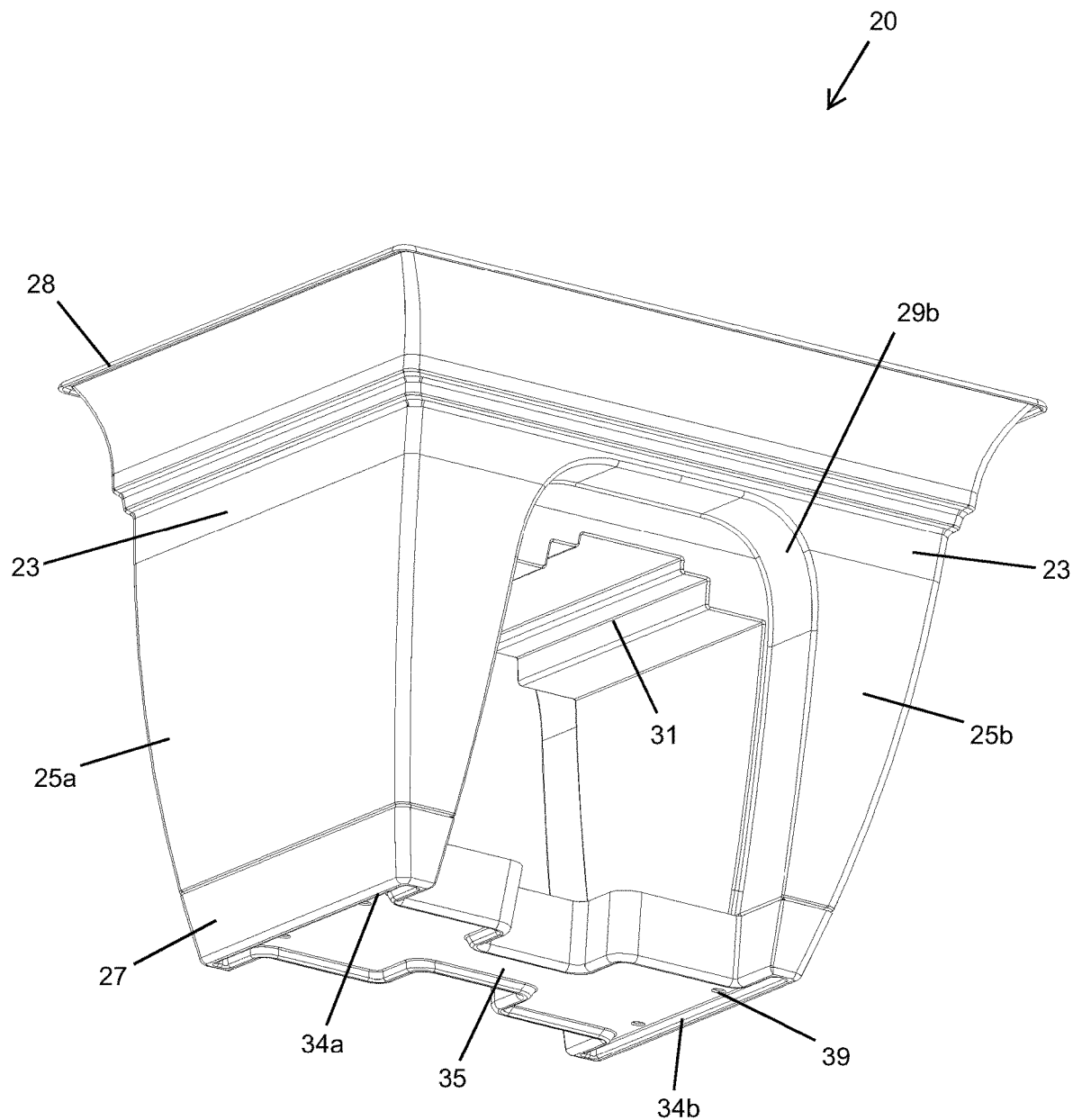
FIG. 13 is a perspective view of the horticultural container.
Figure 14:
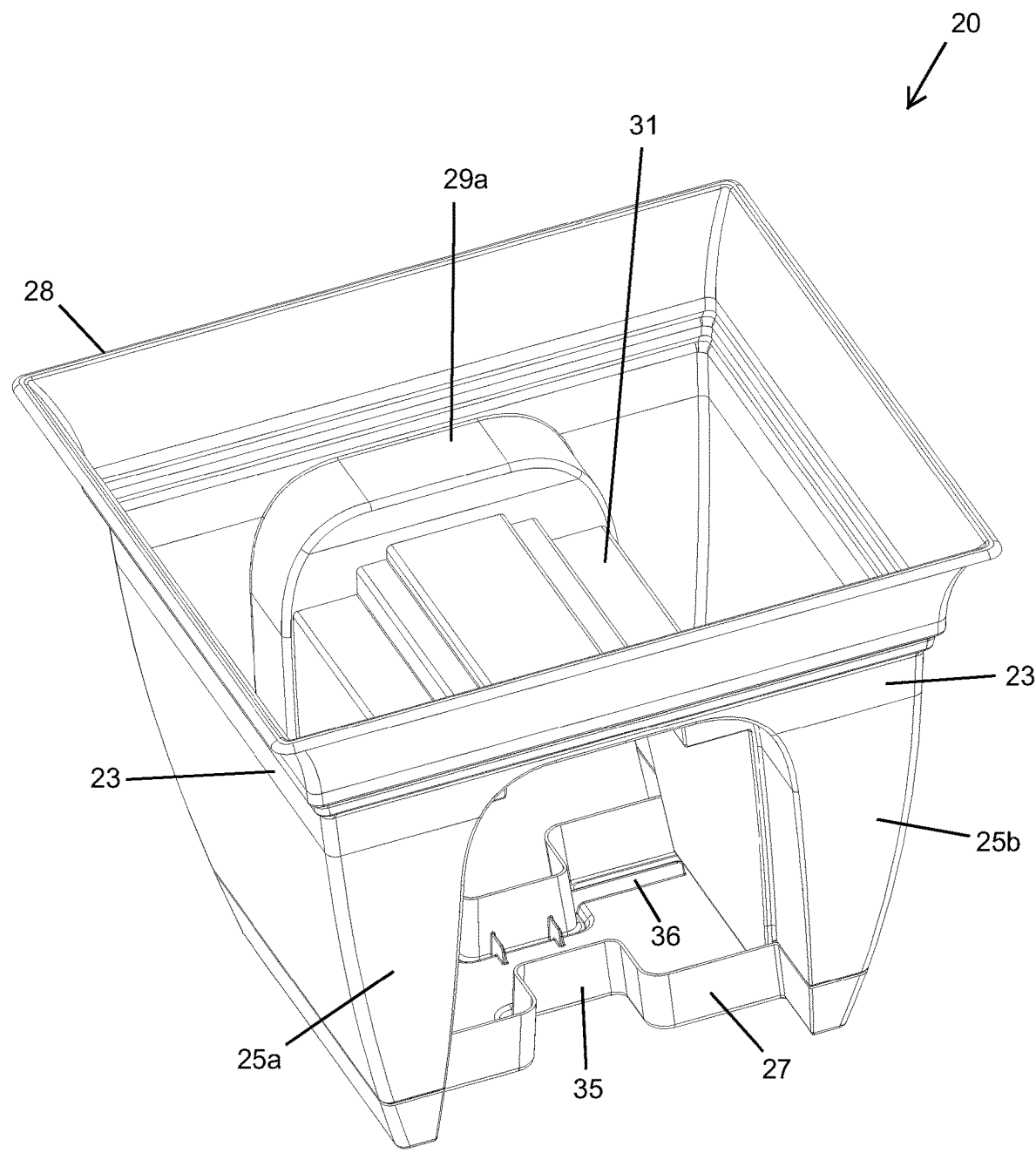
FIG. 14 is a perspective view of the horticultural container.
Figure 15:
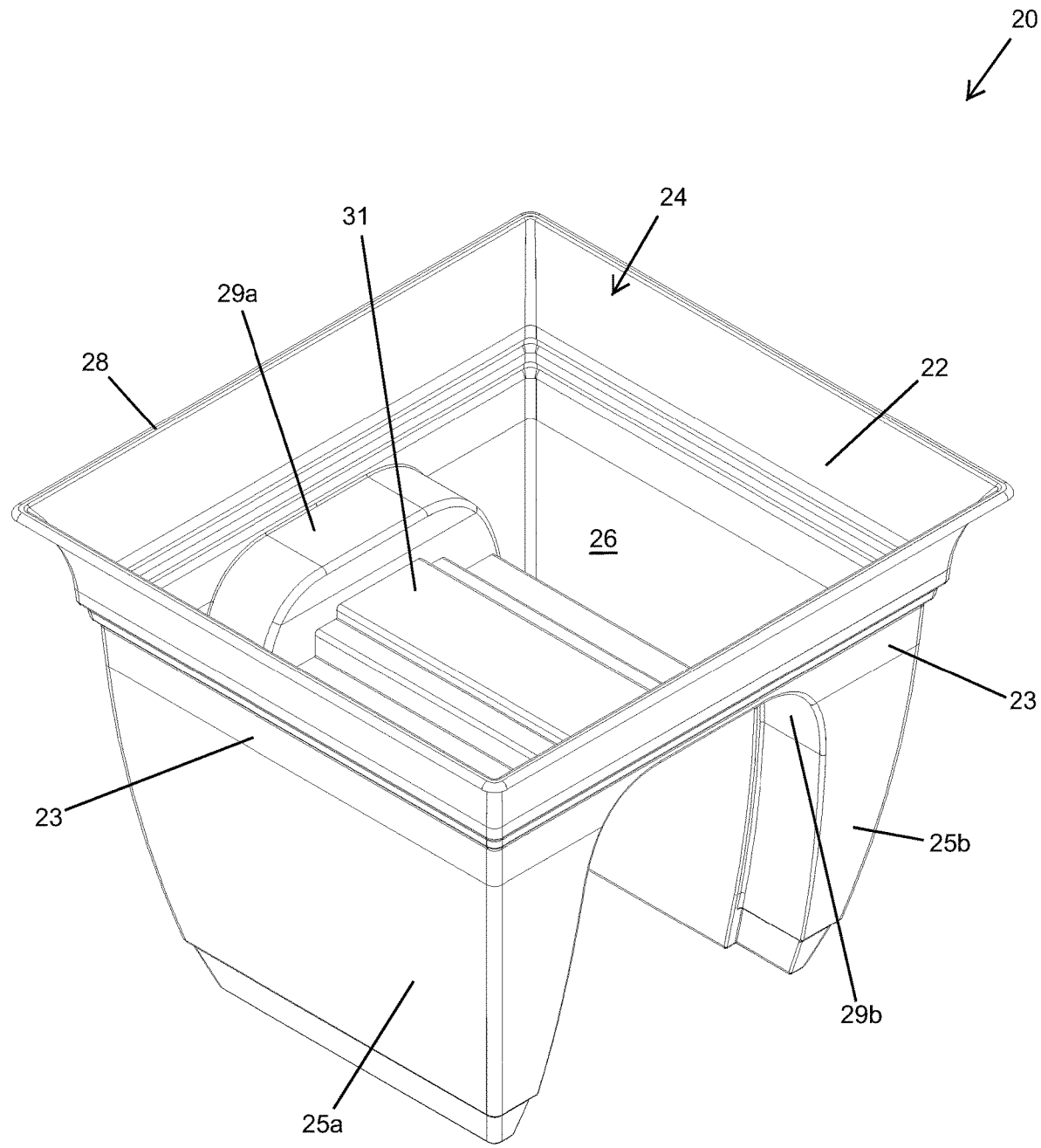
FIG. 15 is a perspective view of the horticultural container without the connective device.
Figure 16:
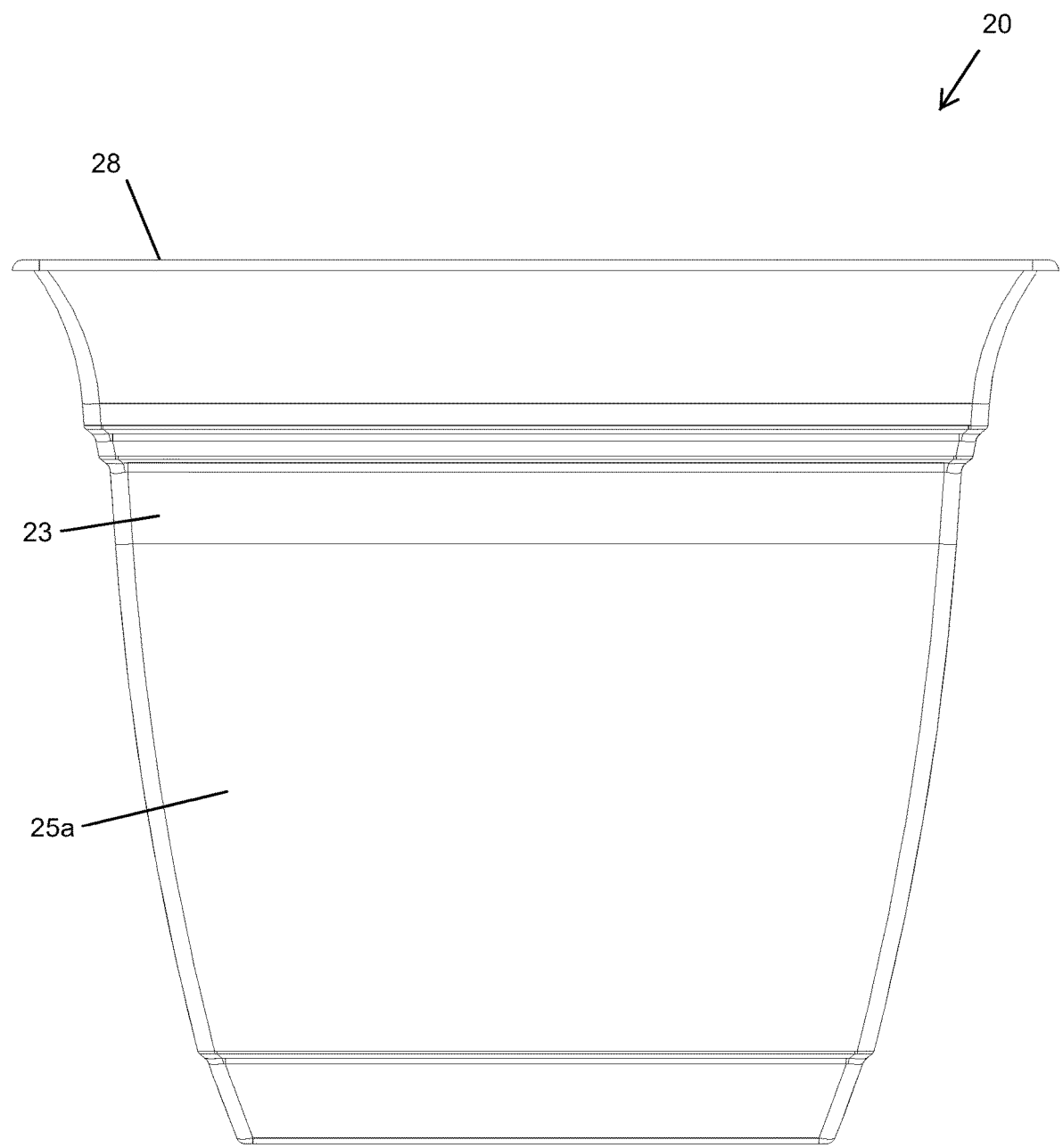
FIG. 16. is a front view of the horticultural container without the connective device, the rear view being a mirror image thereof.
Figure 17:
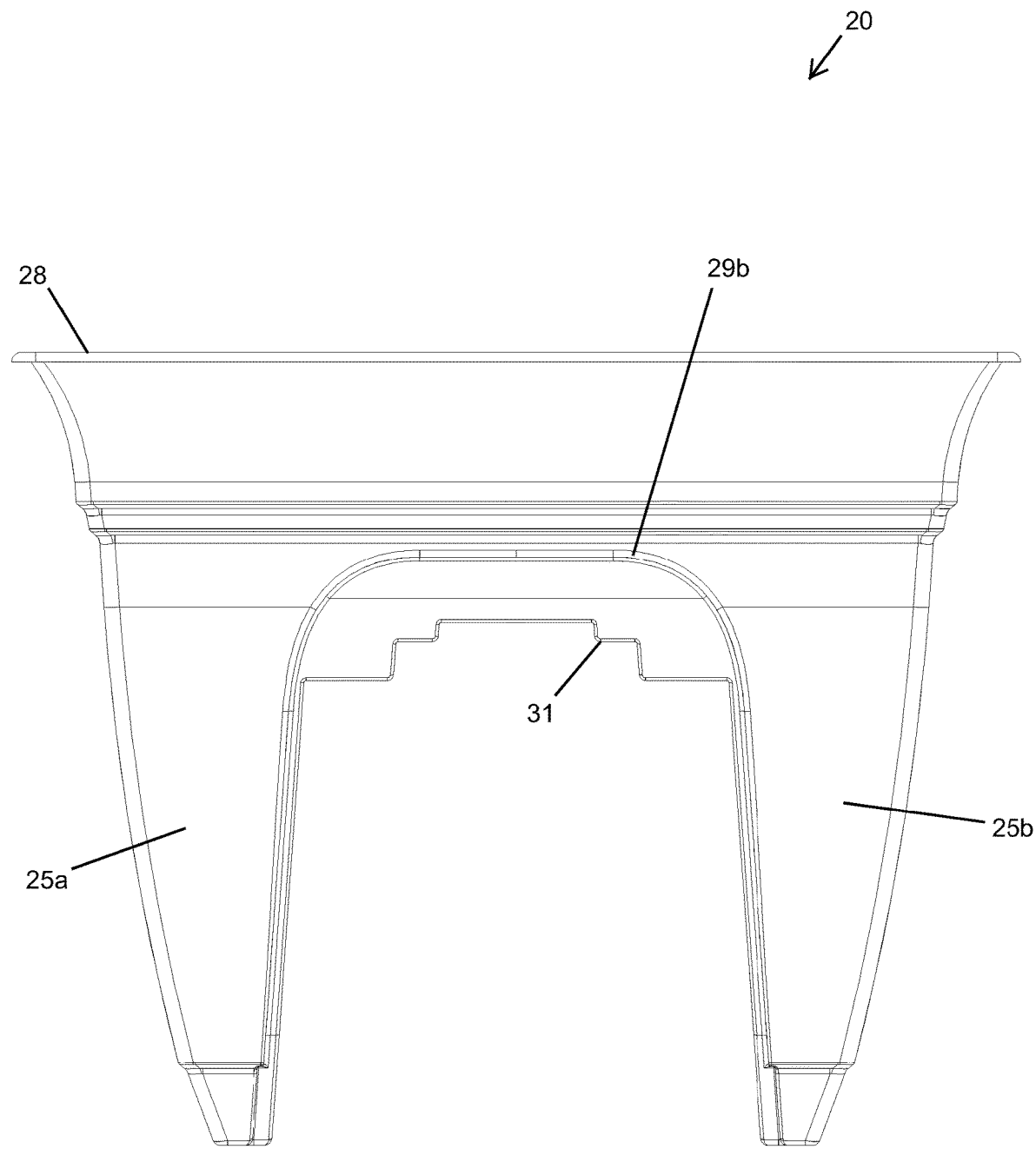
FIG. 17 is a left side view of the horticultural container without the connective device, the right side view being a mirror image thereof.
Figure 18:
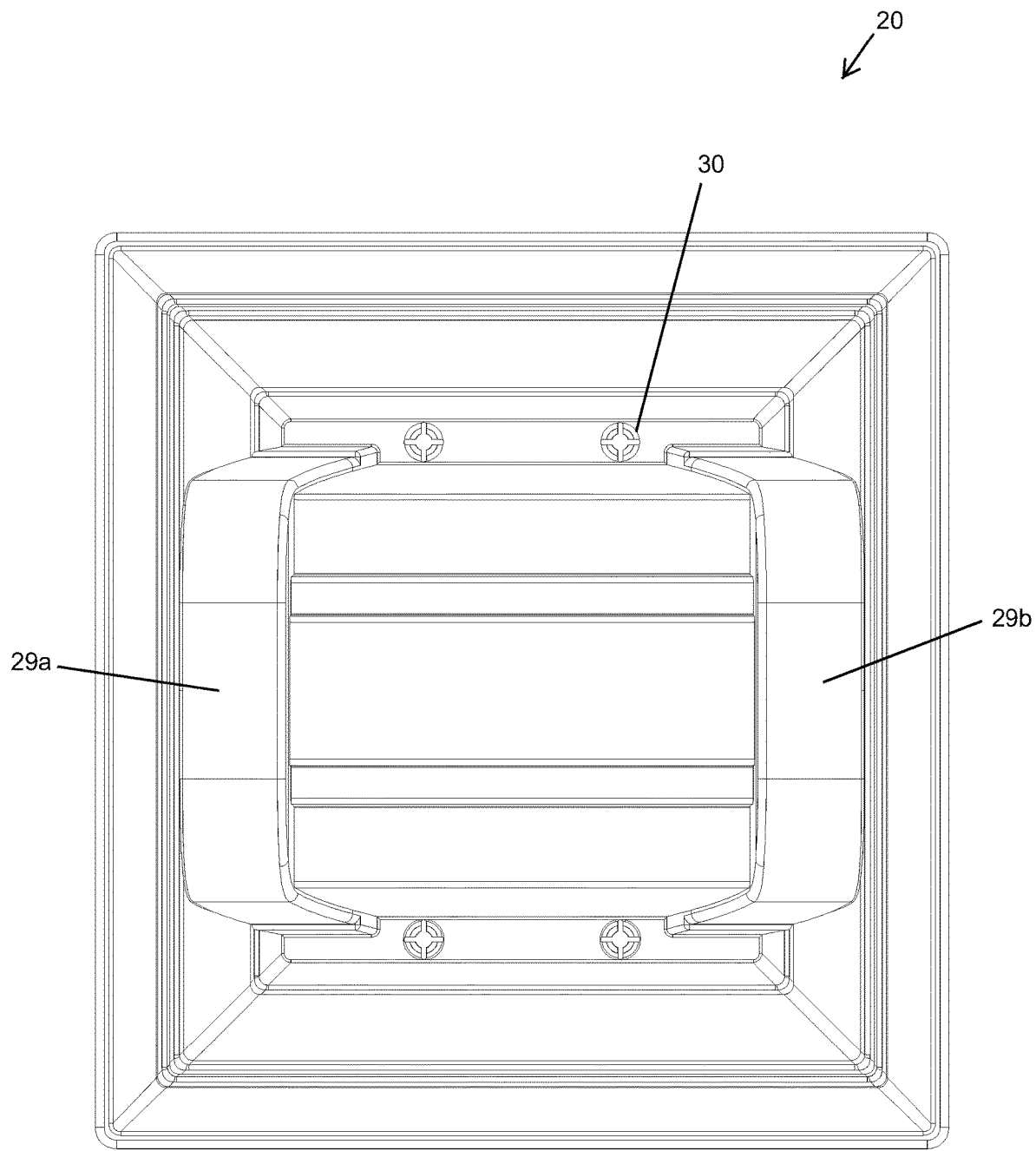
FIG. 18 is a top view of the horticultural container without the connective device.
Figure 19:
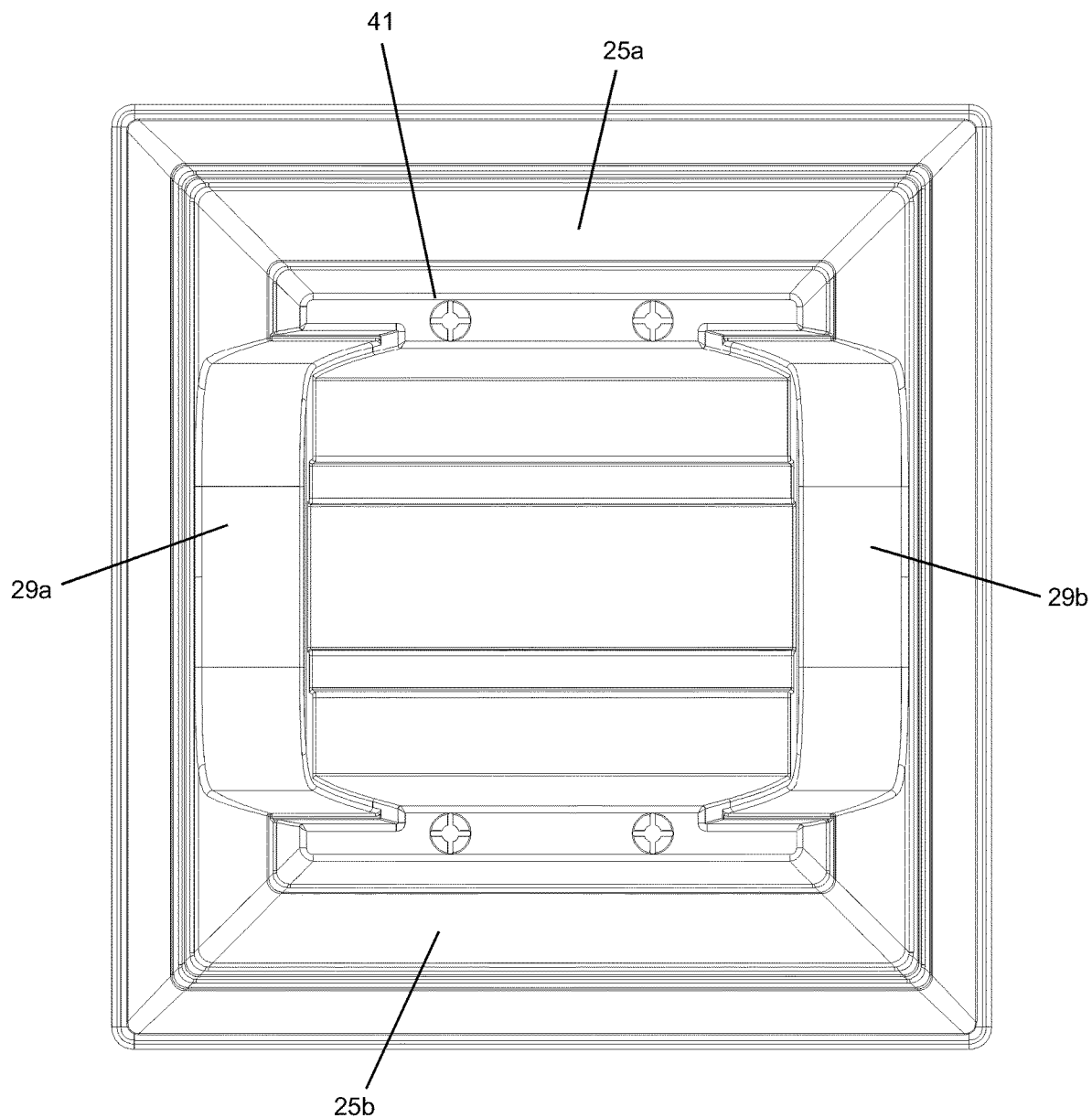
FIG. 19 is a bottom view of the horticultural container without the connective device.
Figure 20:
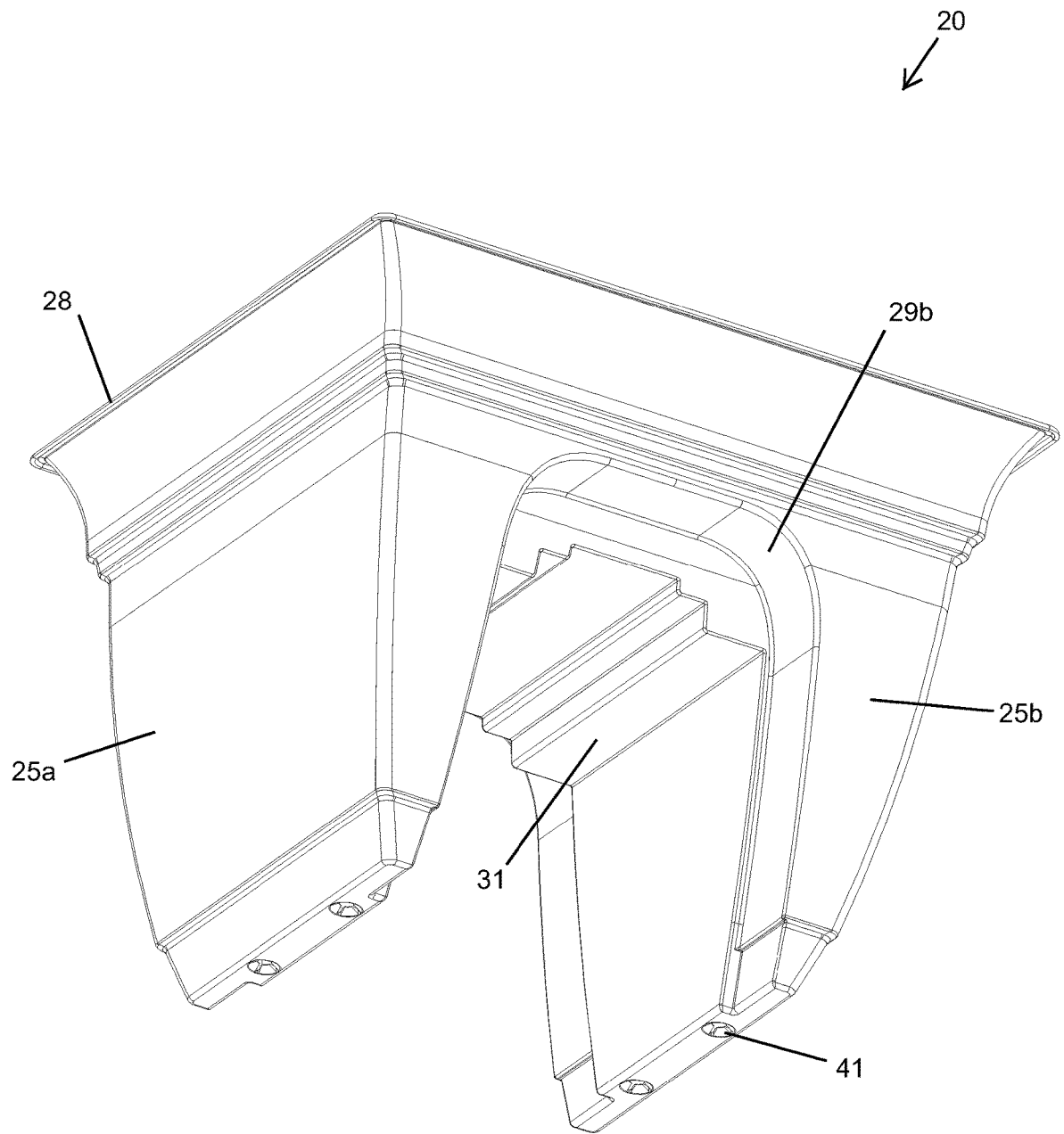
FIG. 20 is a perspective view of the horticultural container without the connective device.
Figure 21:
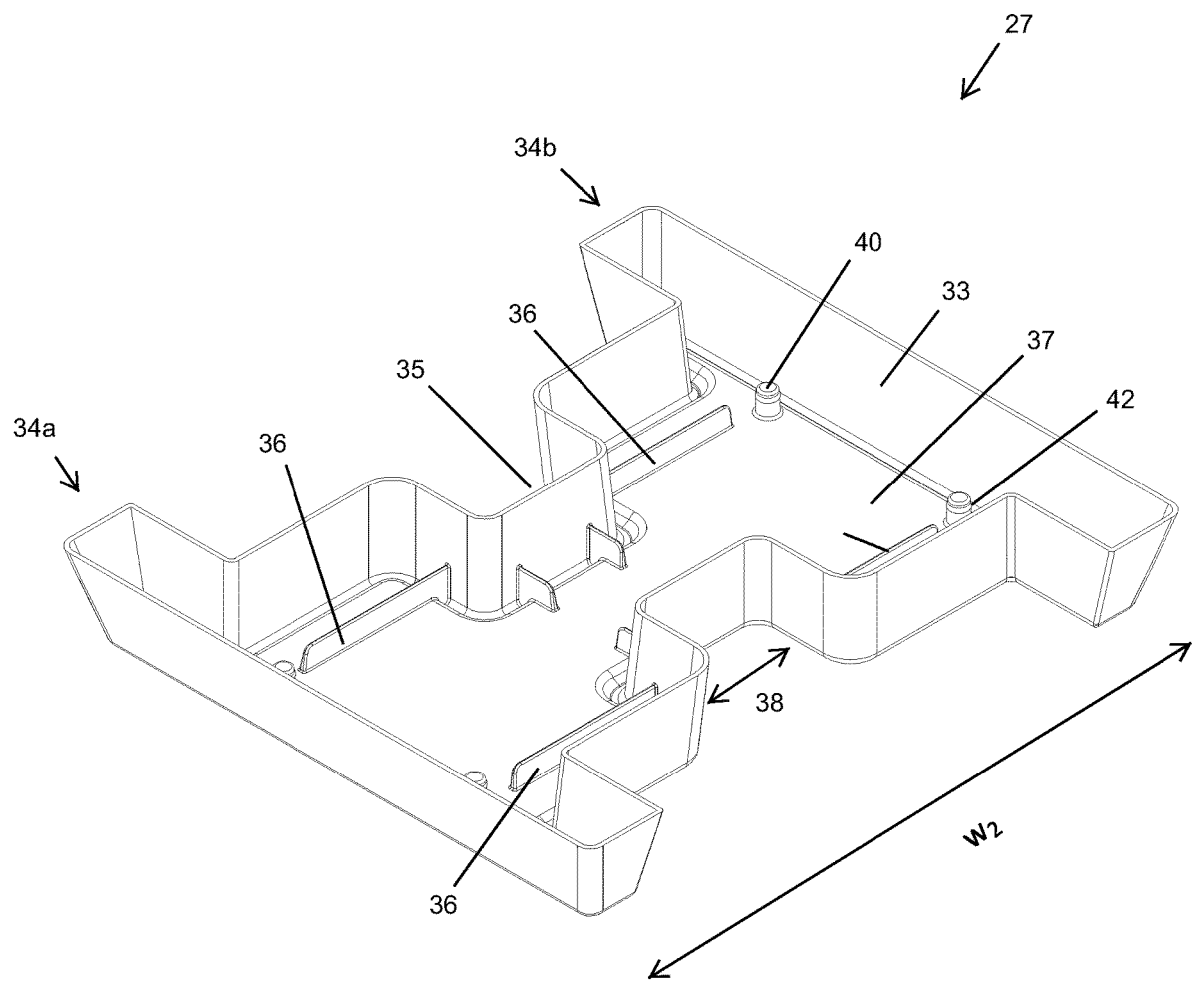
FIG. 21 a perspective view of the connective device.
Figure 22:
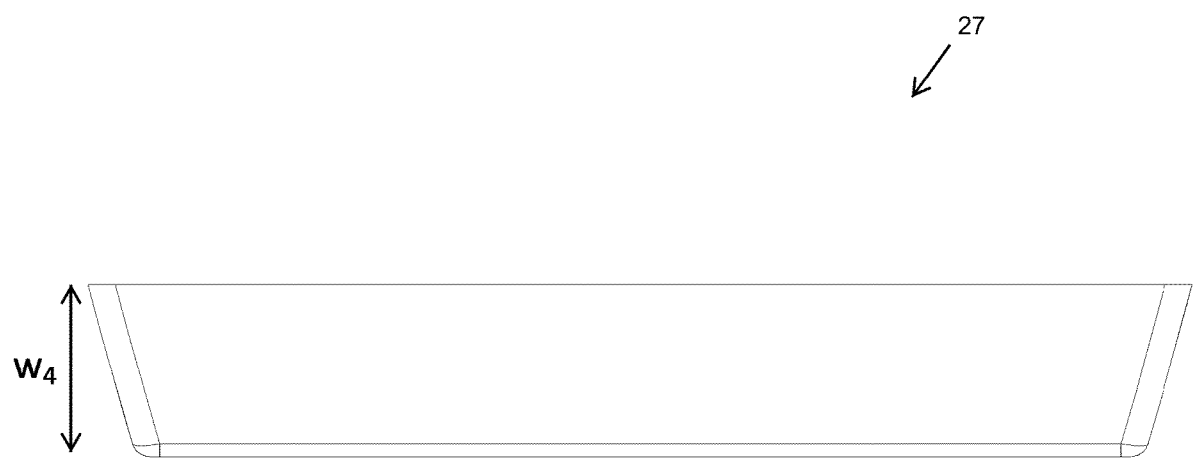
FIG. 22 is a front view of the connective device, the rear view being a mirror image thereof.
Figure 23:
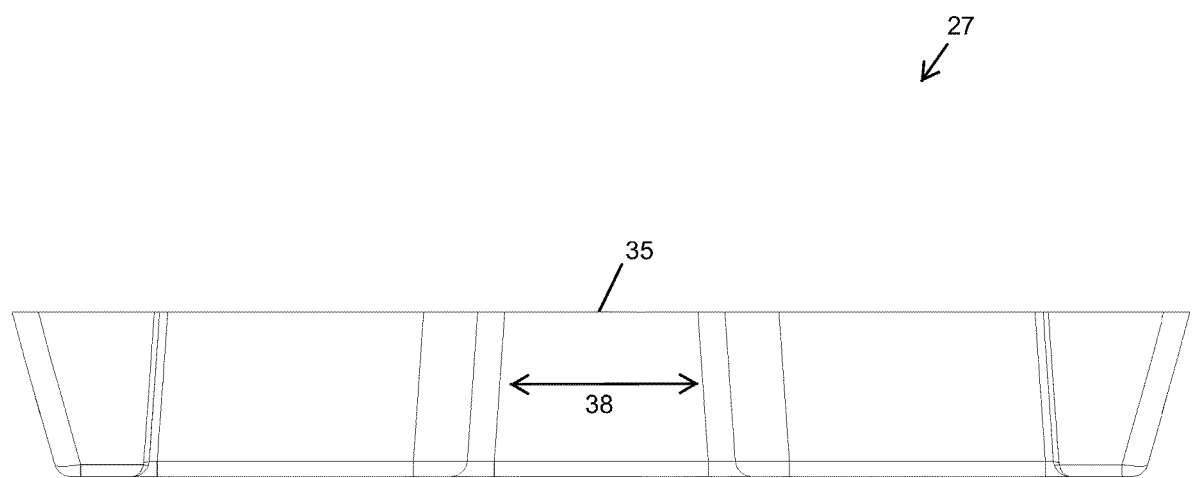
FIG. 23 is a left side view of the connective device, the right side view being a mirror image thereof.
Figure 24:
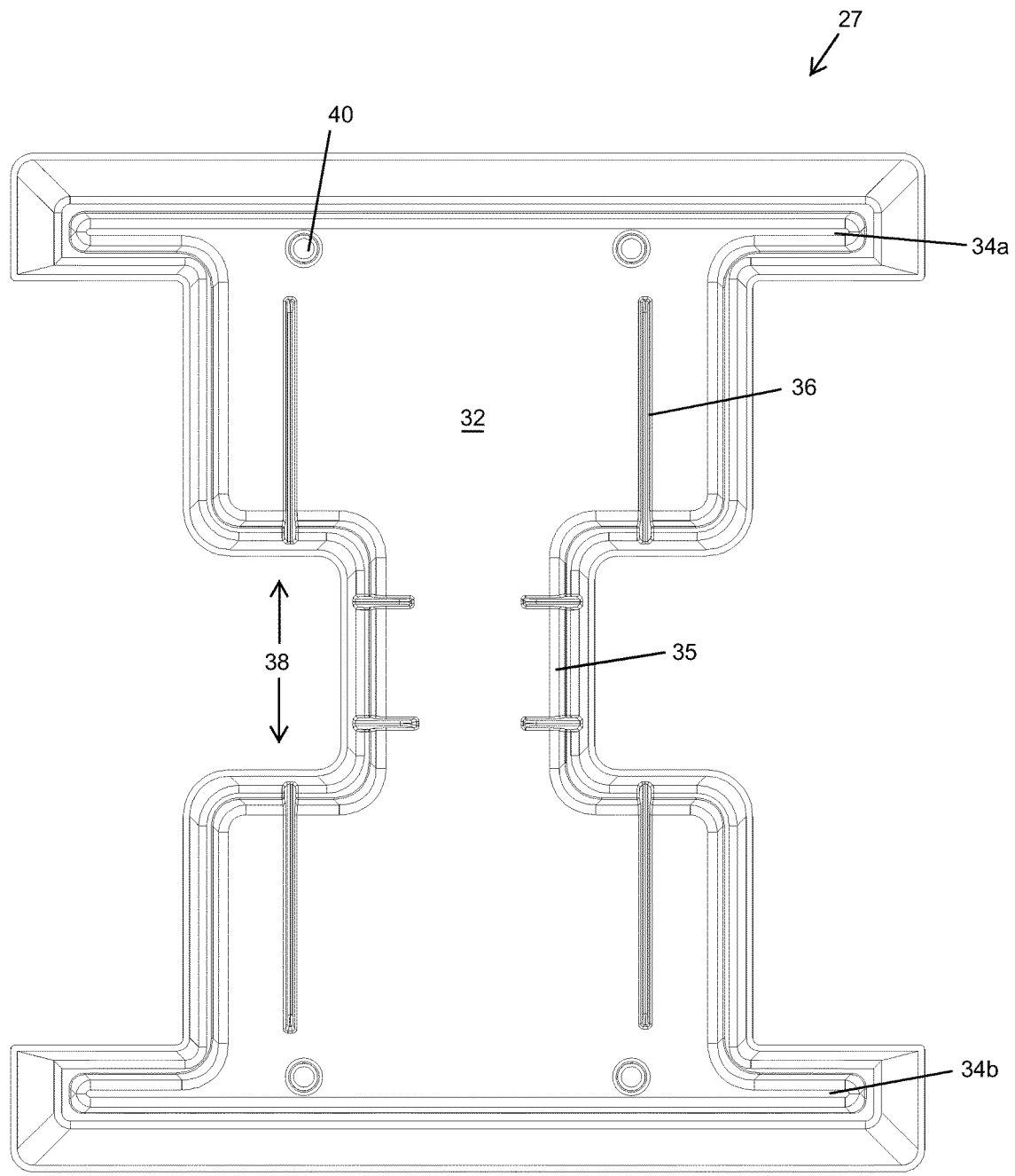
FIG. 24 is a top view of the connective device.
Figure 25:
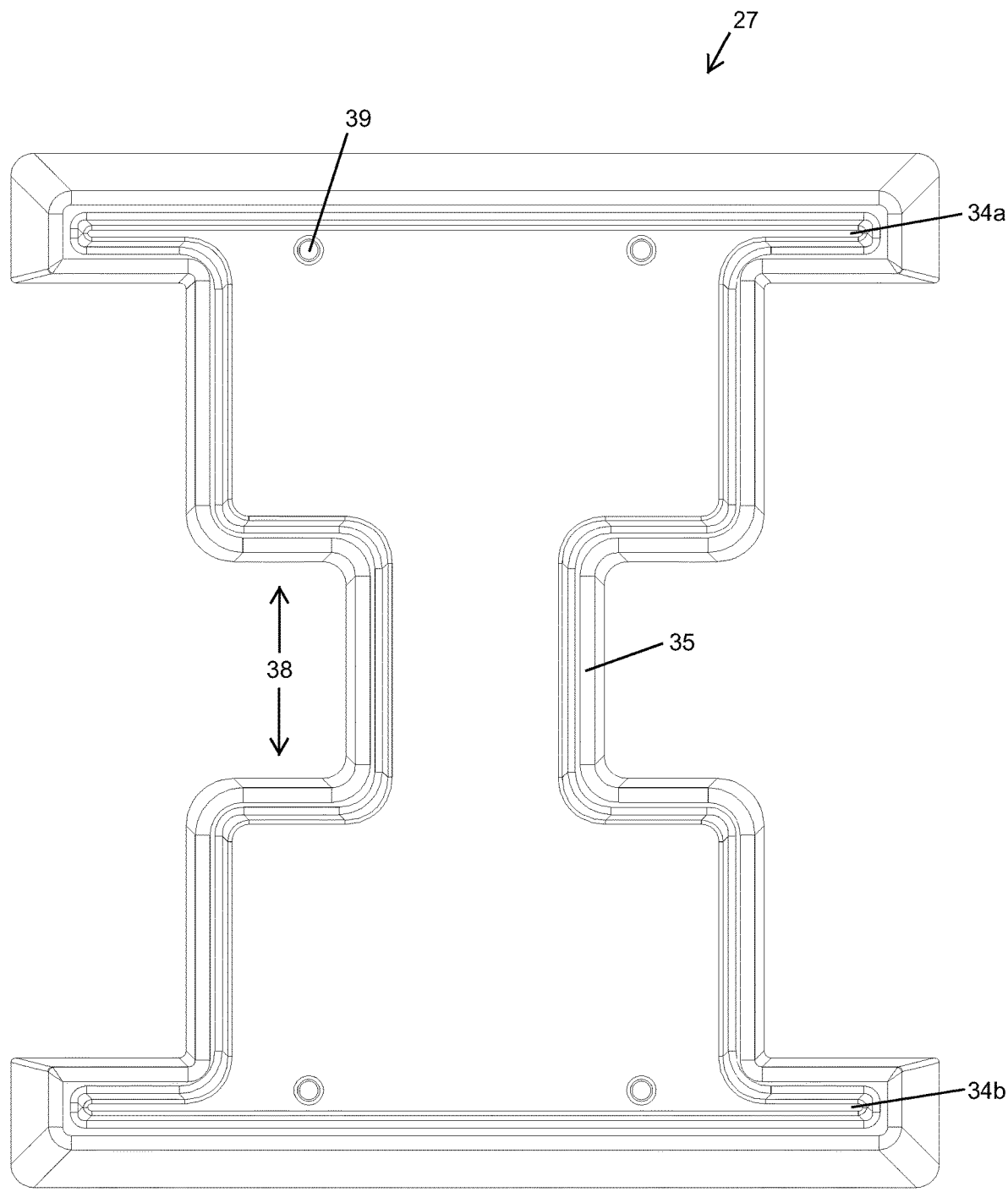
FIG. 25 is a bottom view of the connective device.
Figure 26:
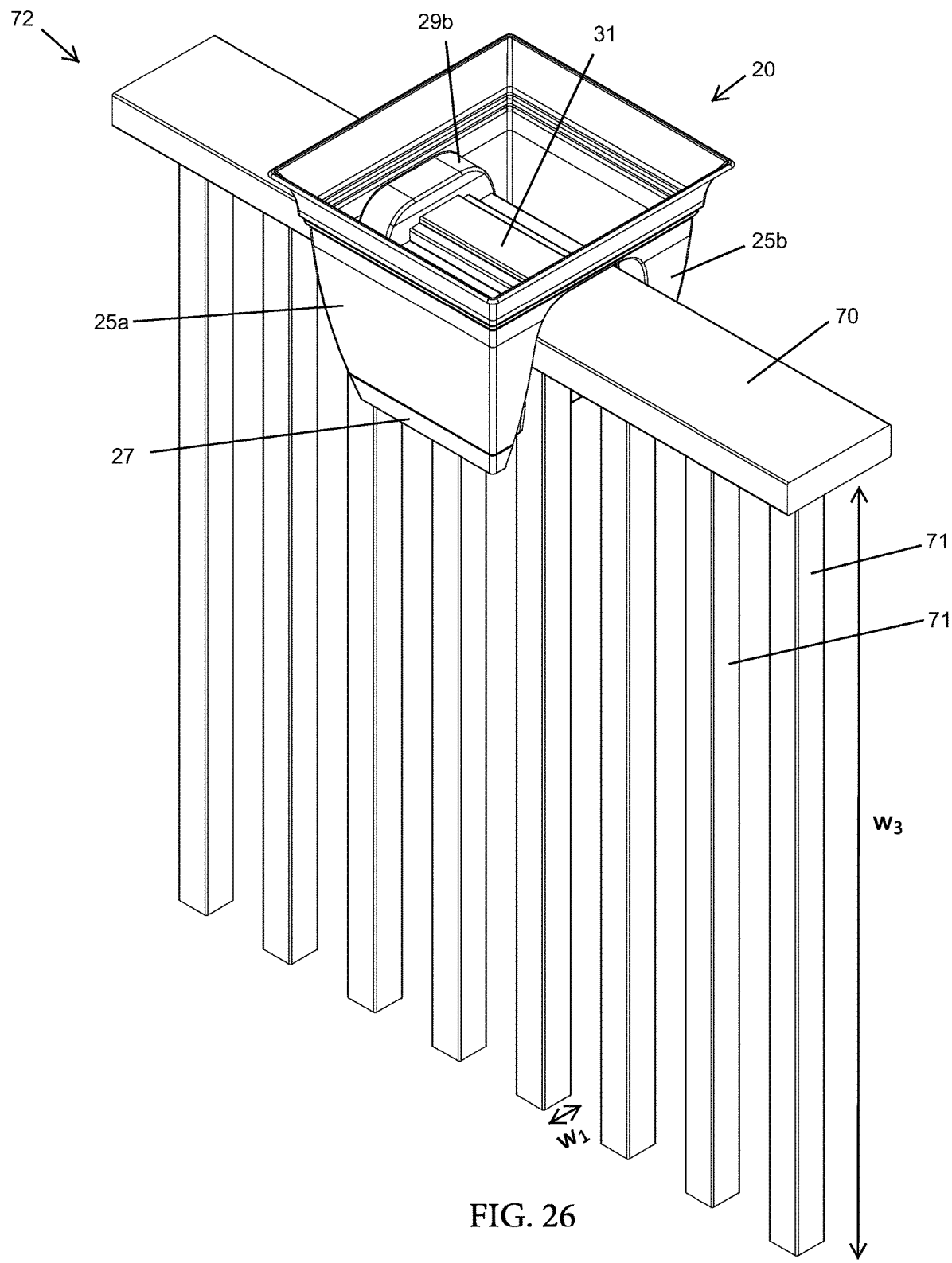
FIG. 26 is a perspective view of the horticultural container secured to a top rail of a railing.
Figure 27:
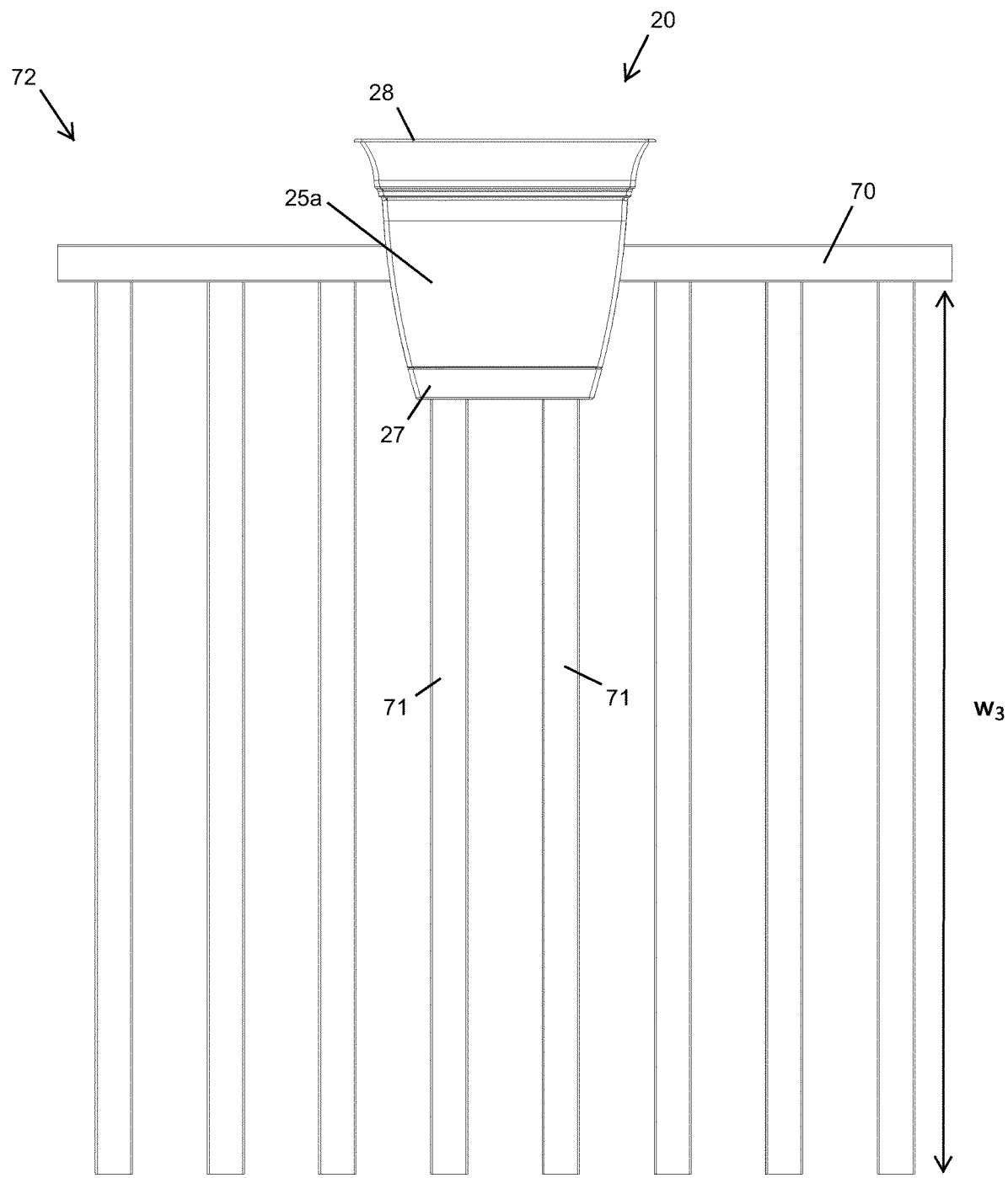
FIG. 27 is a front view of the horticultural container secured to a top rail of a railing, the rear view being a mirror image thereof.
Figure 28:
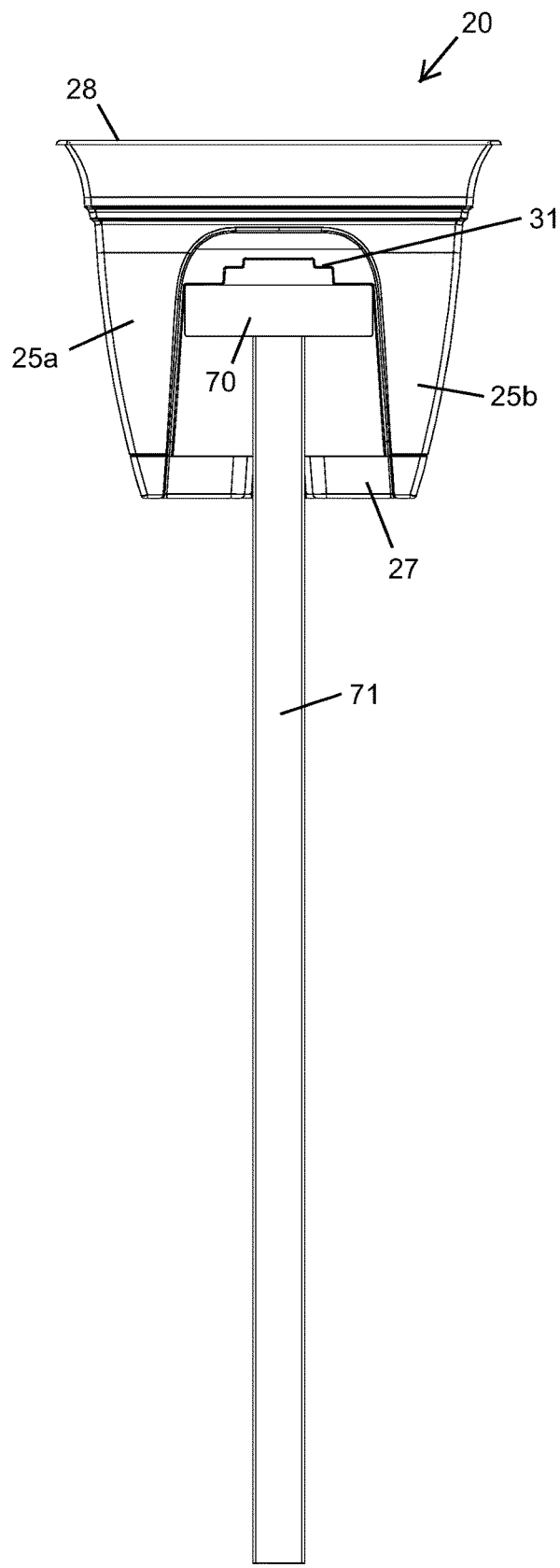
FIG. 28 is a left side view of the horticultural container secured to a top rail of a railing, the right side view being a mirror image thereof.
Figure 29:
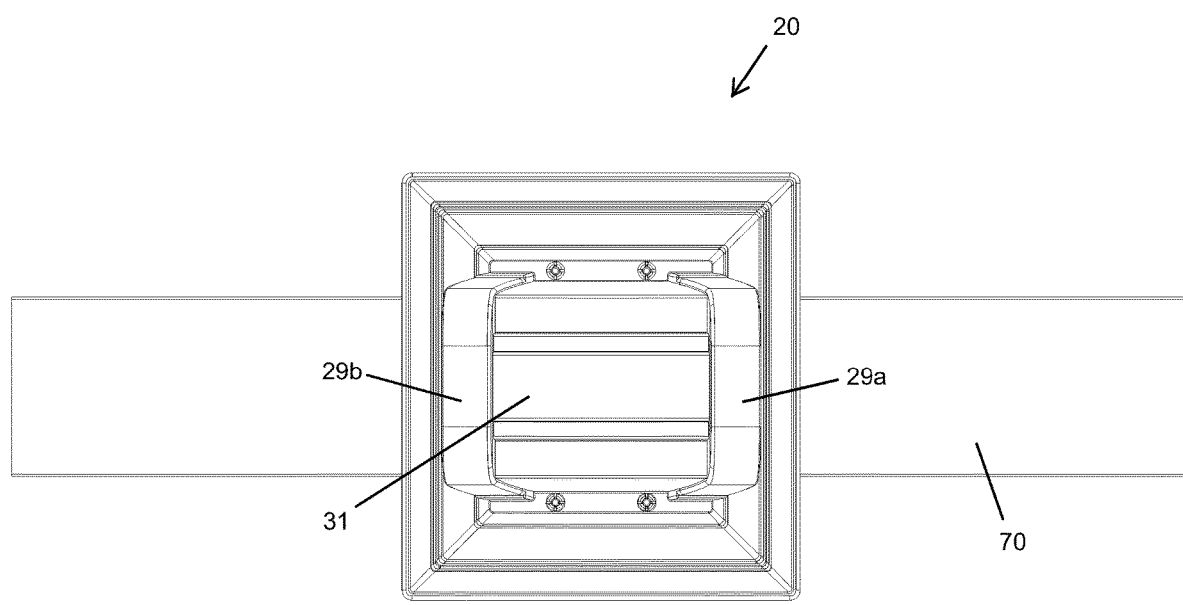
FIG. 29 top view of the horticultural container secured to a top rail of a railing.
Figure 30:
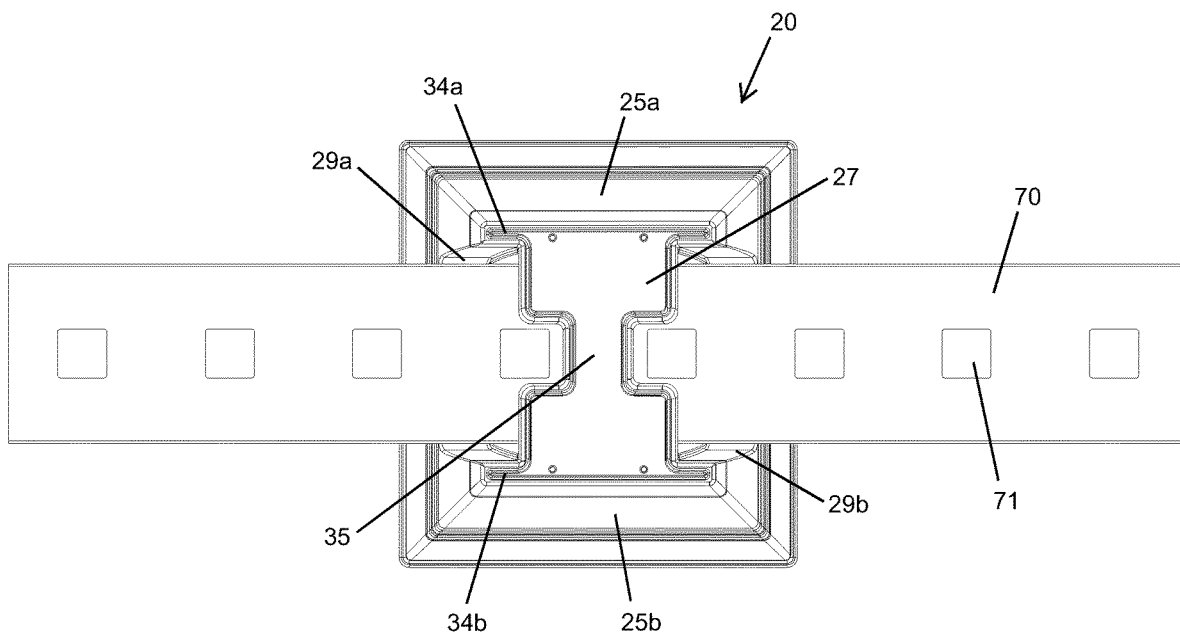
FIG. 30 is a bottom view of the horticultural container secured to a top rail of a railing.
Figure 31:
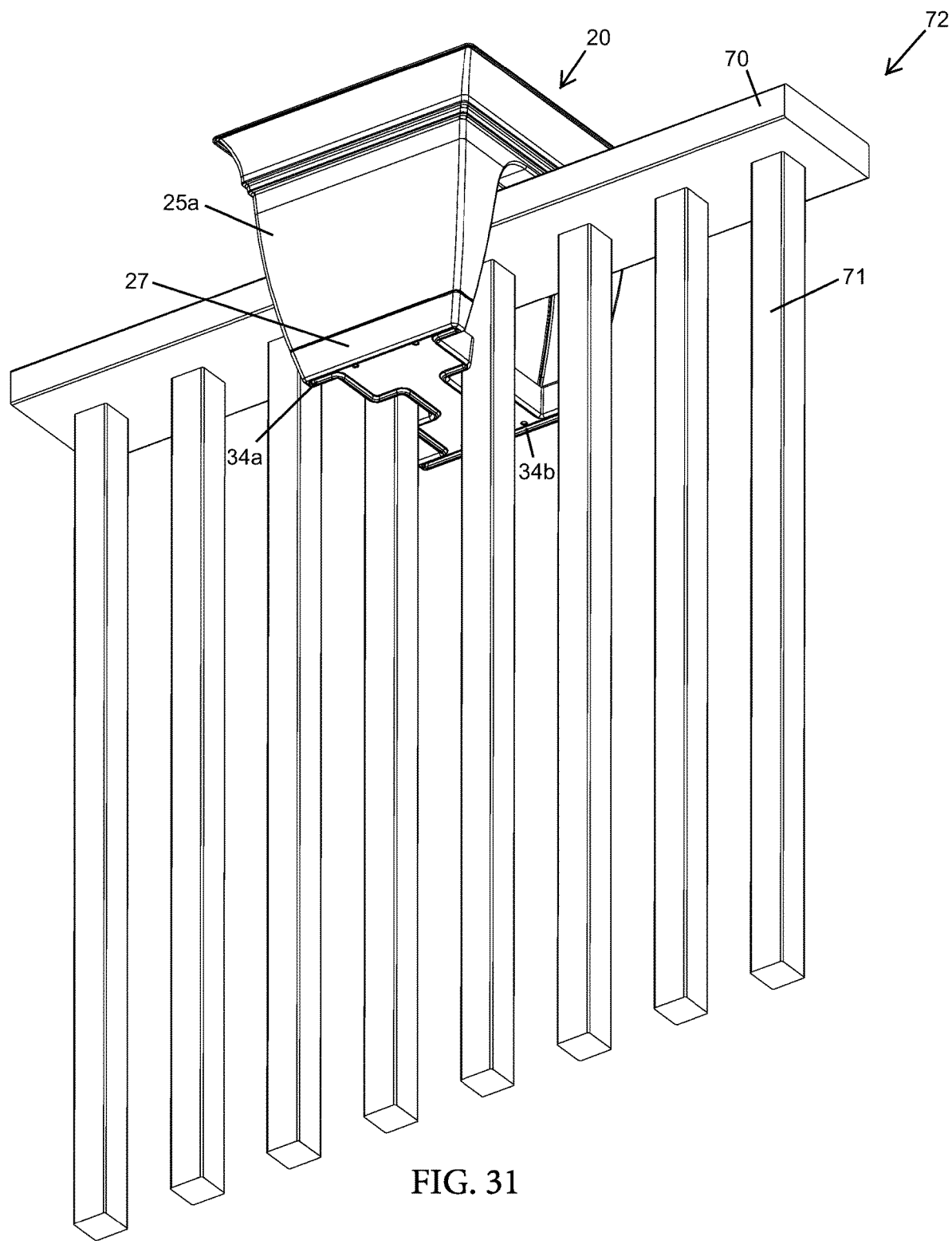
FIG. 31 is a perspective view of the horticultural container secured to a top rail of a railing.

Turning initially to FIGS. 1-7, a first exemplary embodiment of a horticultural container is shown at reference numeral 10. The horticultural container 10 includes a planter body 2 and two legs 5a and 5b. The planter body 2 has four sides 3 and an open top 4, and is rectangular in overall shape. The planter body 2 may have other shapes and/or more than or less than four sides 3. For example, the side(s) and top may form an oval, a circle, a hexagon, or any other desired shape. In the illustrated embodiment, the legs 5a and 5b extend from and are integral with the body 2, so that an interior volume defined by the sides 3 and legs 5a and 5b form from a chamber 6 for a growing medium (e.g. soil) and plants. The growing medium and plants are not shown in the appended drawing figures. Each leg is attached to a removable connecting device 7, also forming part of the horticultural container 10. The connecting device 7 may attach to legs of any shaped planter body. The legs 5a and 5b may be removable from the planter body 2.

Figure 32:
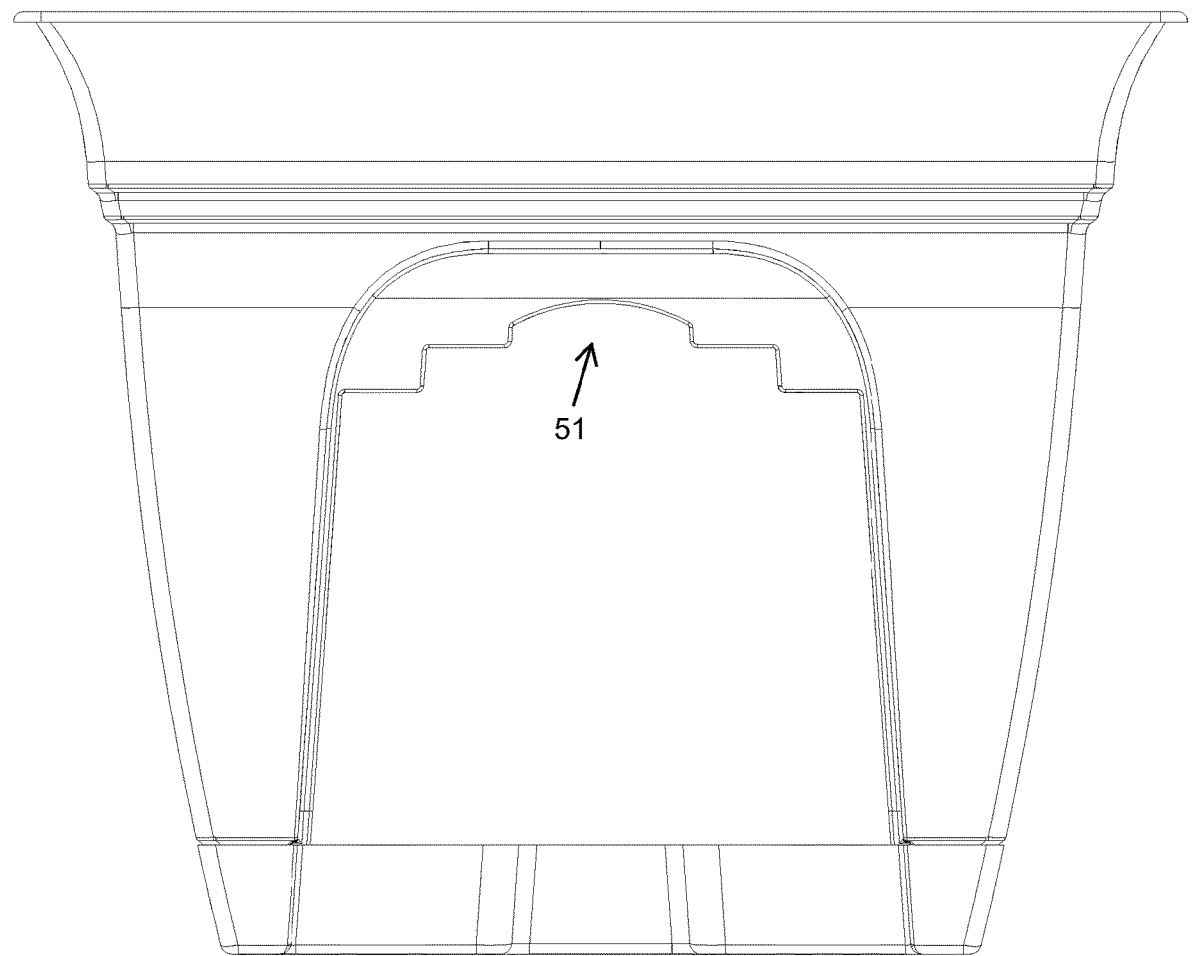
FIG. 32 is a left side view of an exemplary horticultural container, the right side view being a mirror image thereof.
Figure 33:
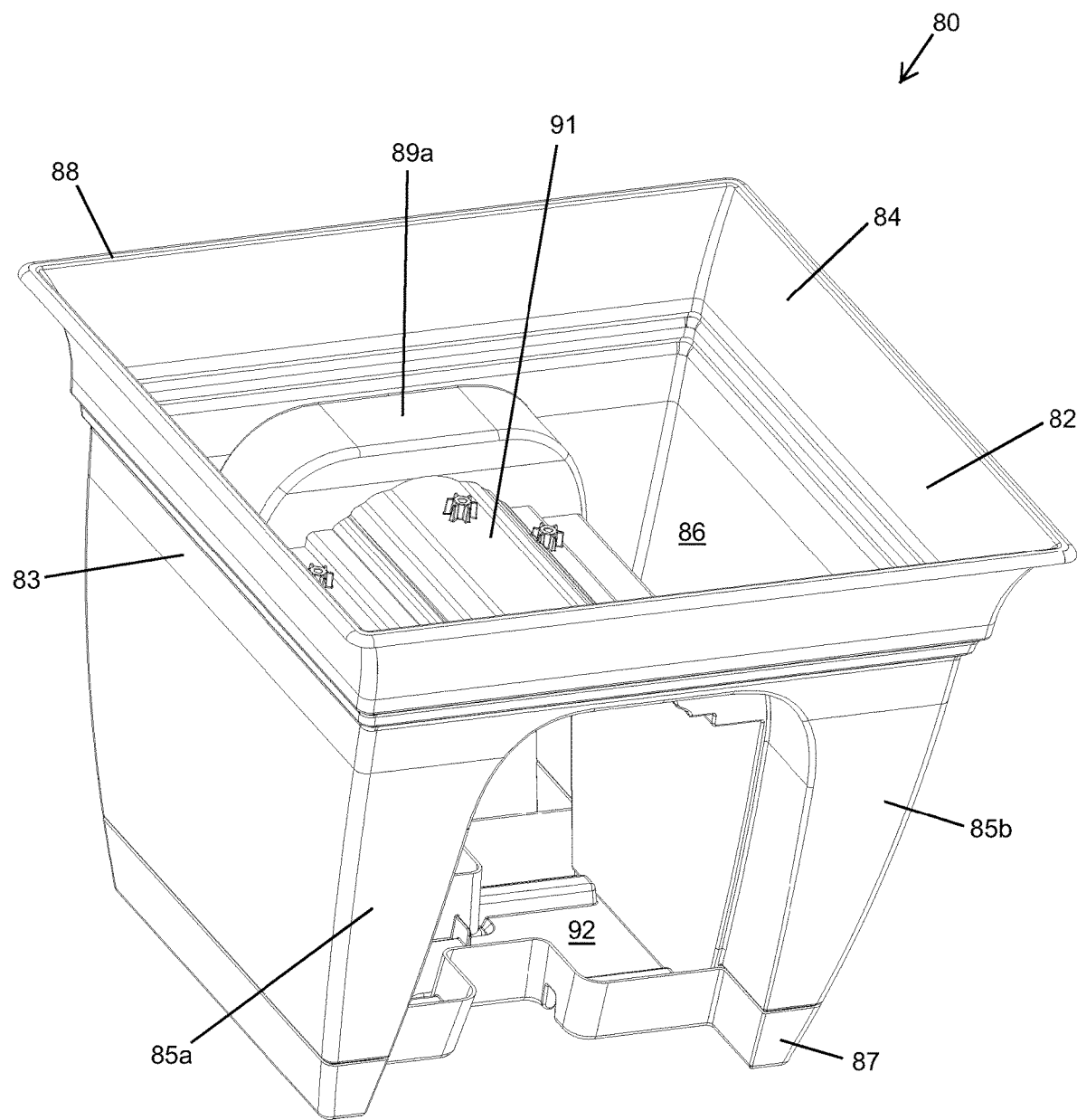
FIG. 33 is a perspective view of an exemplary embodiment of the horticultural container.
Figure 34:
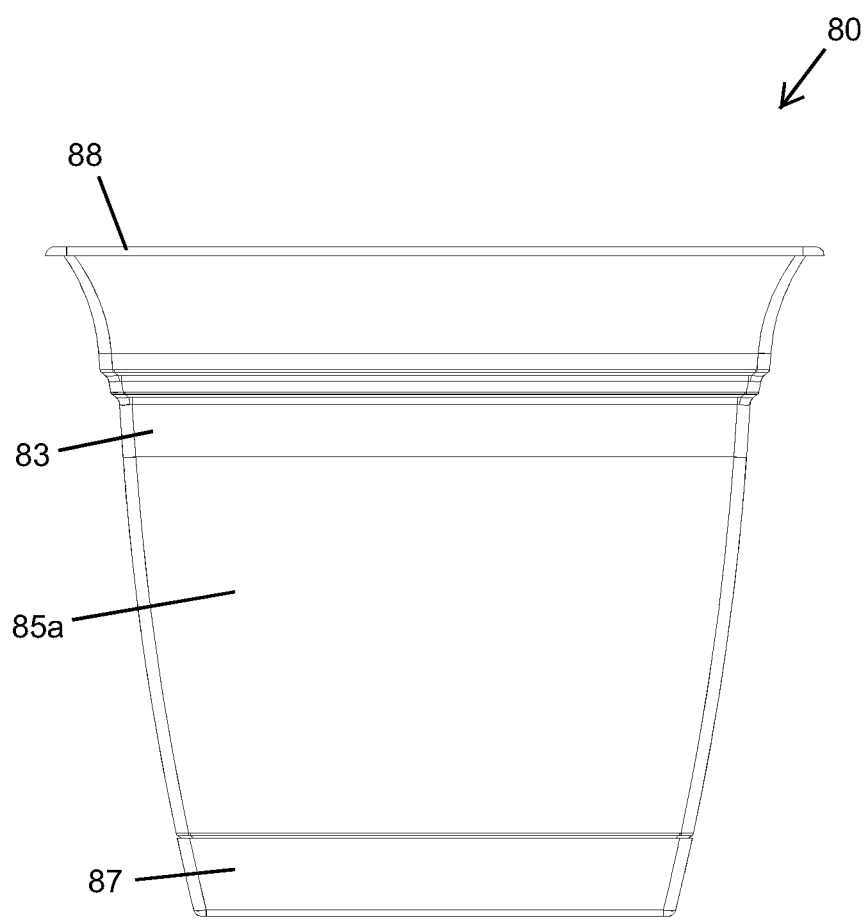
FIG. 34 is a front view of the horticultural container, the rear view being a mirror image thereof.

The planter body 2 includes an upper rim 8, handles 9a and 9b, and a stepped bottom wall 11. The stepped bottom wall 11 may be shaped to accommodate a variety of top rails 70 of a railing 72. For example, the stepped bottom 11 may be shaped to accommodate a flat top rail 72, or, as shown in FIG. 32, the stepped bottom 51 may be shaped to accommodate a curved top rail 72. The upper rim 8 is located at a top of the four sides 3 and may include a decorative feature. The handles 9a and 9b are formed from a recess in two opposing sides 3 of the planter body 2.

The planter body 2 may further include one or more interior walls 12, that may be positioned on top of the protrusion of the handle 9a or 9b. The interior walls 12 and an adjacent side 3 to which the interior walls 12 connect may form a further enclosure having an open top. The further enclosure is located within the chamber 6. Within the enclosure formed by the interior wall 12, there may be holes 13 through the bottom wall at the respective handle 9. The holes 13 allow for a cable tie, string, a strap, or other flexible member to pass through the horticulture container 10 and around a top rail 70 of the railing 72 to further secure the container 10 to the railing. The holes 13, which are optional, may be positioned at other locations.

With additional reference to FIGS. 8-25, another exemplary embodiment of a horticultural container is shown at reference numeral 20. The horticultural container 20 includes a planter body 22 and two legs 25a and 25b. The planter body 22 has four sides 23, an open top 24, and is square in overall shape. In the illustrated embodiment, the legs 25a and 25b form a chamber 26 for a growing medium (e.g. soil) and plants. The growing medium and plants are not shown in the appended drawing figures. Each leg is attached to a removable connecting device 27, also forming part of the horticultural container 20. The planter body 22 may have other shapes and/or more than four sides 23. For example, the side(s) may form an oval or a circle. The legs 25a and 25b may be removable from the planter body 22.

The planter body 22 includes an upper rim 28, handles 29a and 29b, and steps at a bottom 31. The upper rim 28 and four sides 23 form the chamber and may include a decorative feature. The handles 29a and 29b are formed from a recess in two sides 23 of the planter body 22.

Figure 35:
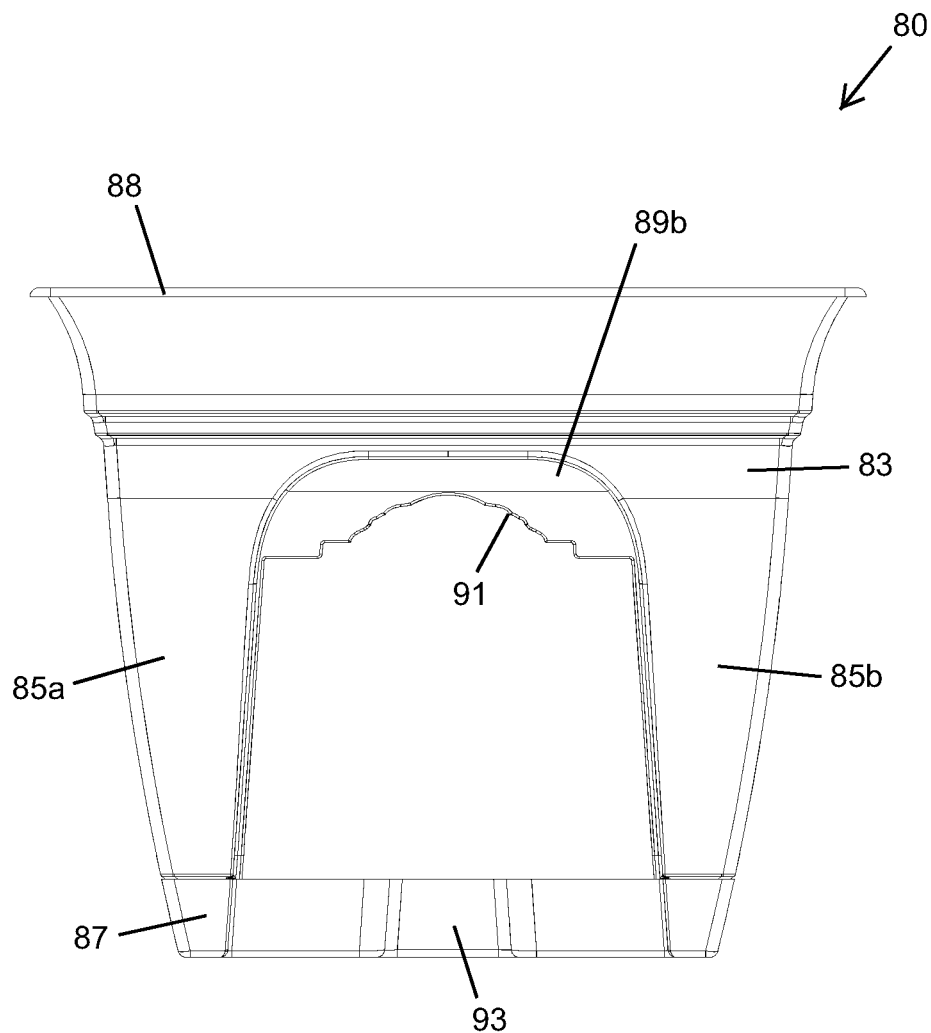
FIG. 35 is a left side view of the horticultural container, the right side view being a mirror image thereof.
Figure 36:
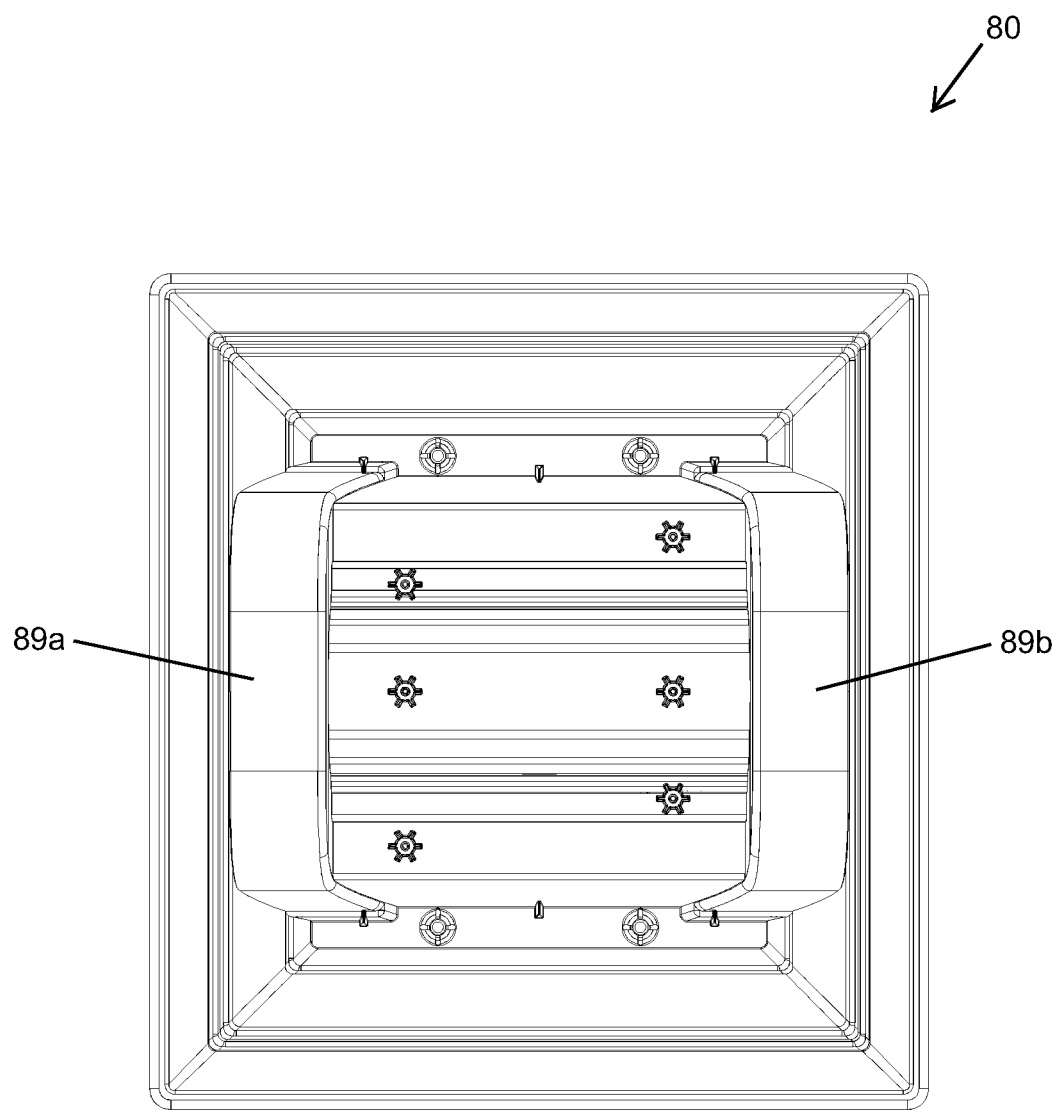
FIG. 36 is a top view of the horticultural container.
Figure 37:
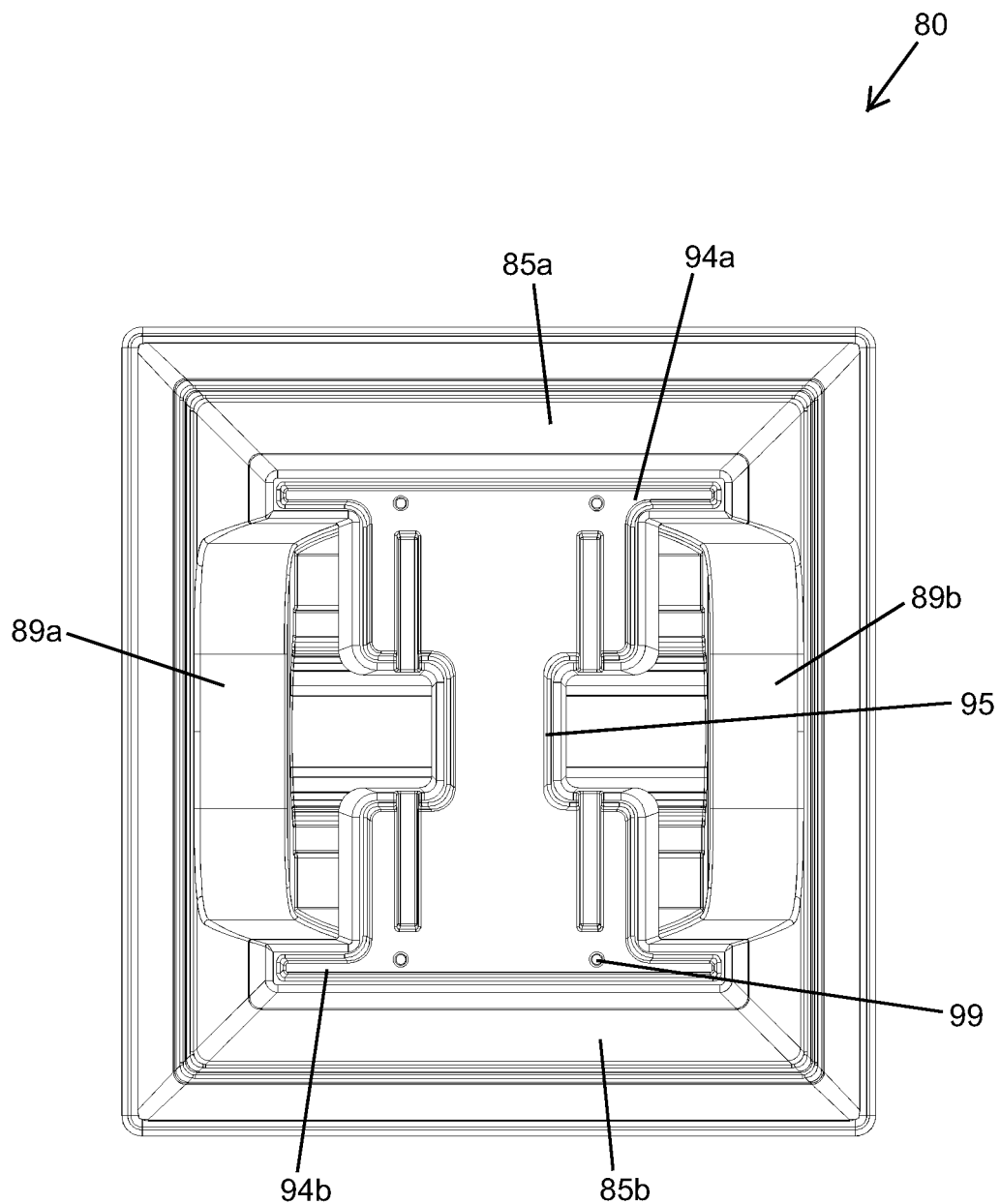
FIG. 37 is a bottom view of the horticultural container.
Figure 38:
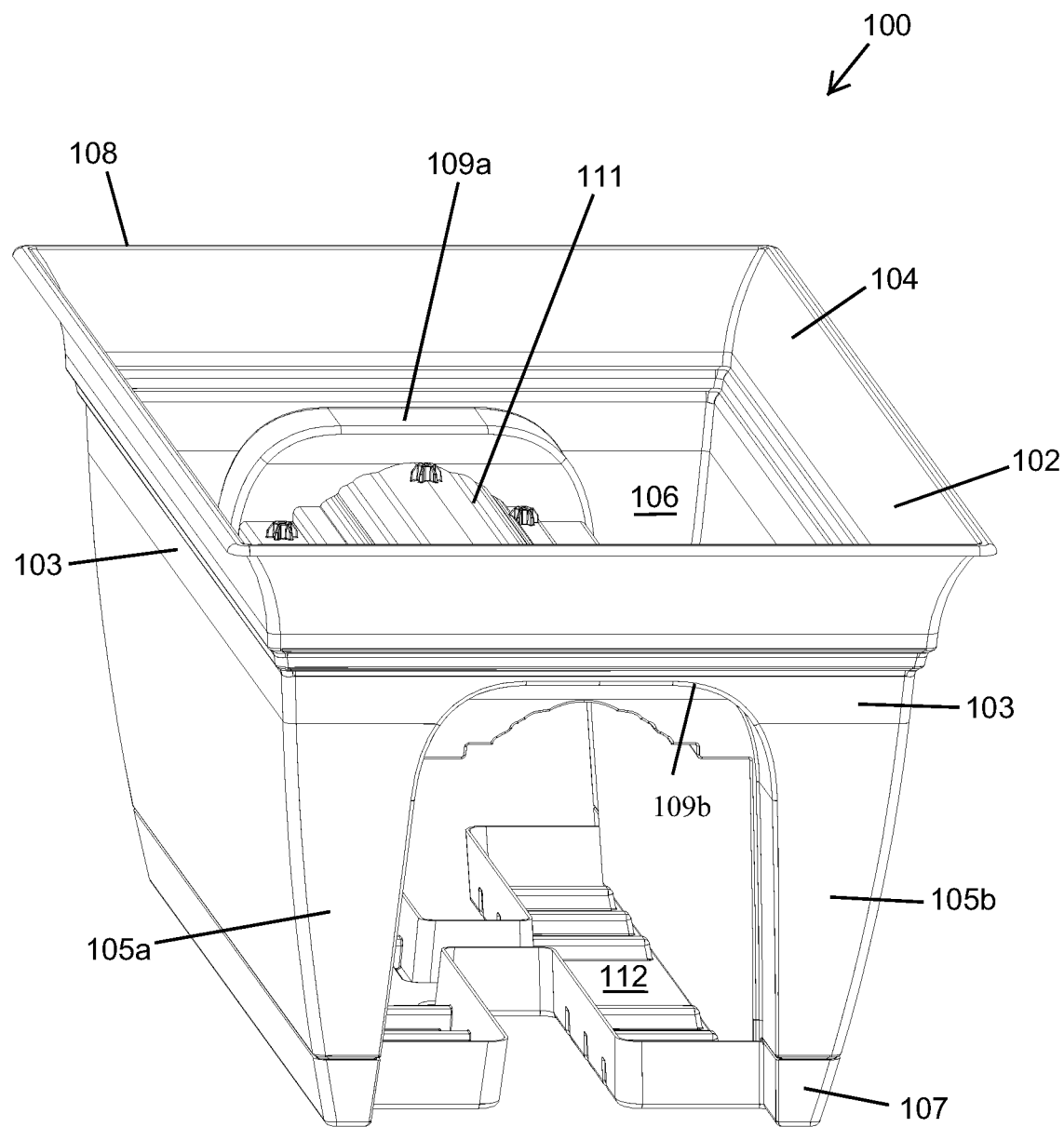
FIG. 38 is a perspective view of an exemplary embodiment of the horticultural container.
Figure 39:
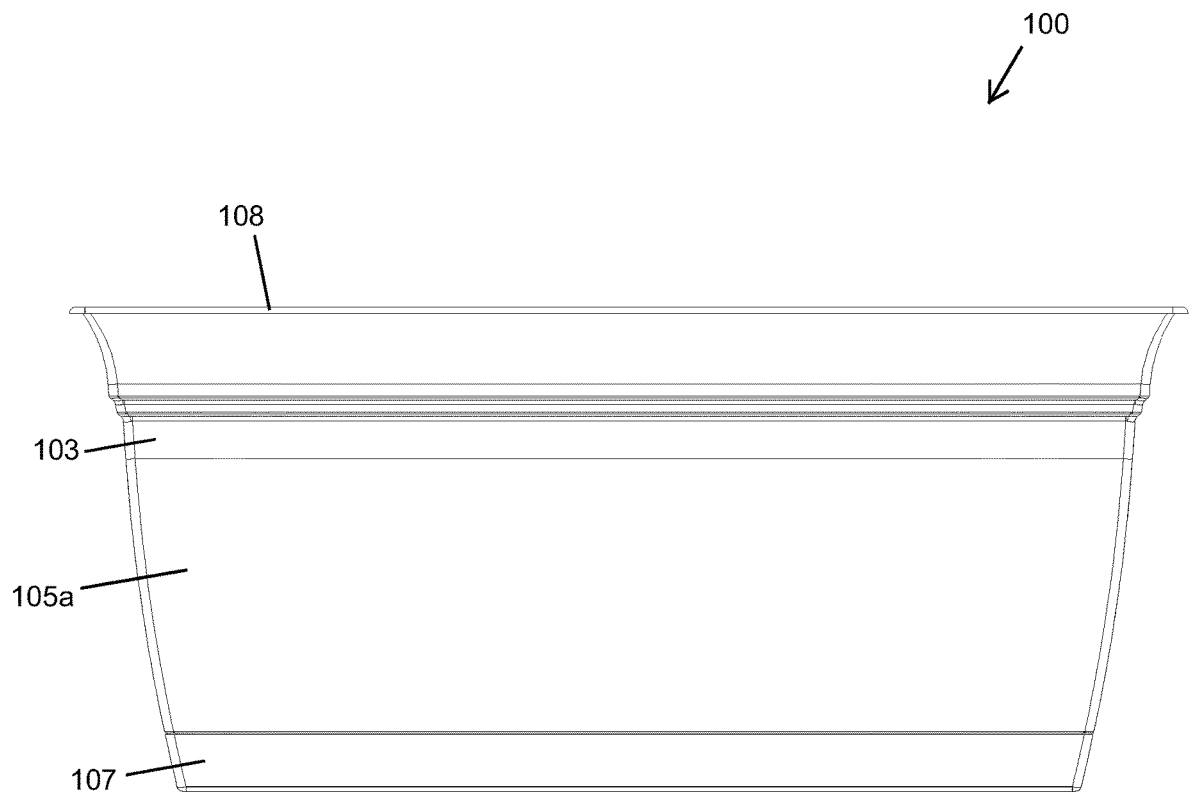
FIG. 39 is a front view of the horticultural container, the rear view being a mirror image thereof.

Turning now to FIGS. 33-37, another exemplary embodiment of a horticultural container is shown at reference numeral 80. The horticultural container 80 includes a planter body 82 and two legs 85a and 85b. The planter body 82 has four sides 83 and an open top 84, and is square in overall shape. The planter body 82 may have other shapes and/or more than or less than four sides 83. For example, the side(s) and top may form an oval, a circle, a hexagon, or any other desired shape. In the illustrated embodiment, the legs 85a and 85b extend from and are integral with the body 82, so that an interior volume defined by the sides 83 and legs 85a and 85b form from a chamber 86 for a growing medium (e.g. soil) and plants. The growing medium and plants are not shown in the appended drawing figures. Each leg is attached to a removable connecting device 87, also forming part of the horticultural container 80. The connecting device 87 may attach to legs of any shaped planter body. The legs 85a and 85b may be removable from the planter body 82. The planter body 82 includes an upper rim 88, handles 89a and 89b, and a stepped bottom wall 91. The stepped bottom wall 91 may be shaped to accommodate a variety of top rails 70 of a railing 72. For example, the stepped bottom 91 may be shaped to accommodate a flat top rail 72, or, as shown in FIG. 35, the stepped bottom 91 may be shaped to accommodate a curved top rail 72. The upper rim 88 is located at a top of the four sides 83 and may include a decorative feature. The handles 89a and 89b are formed from a recess in two opposing sides 83 of the planter body 82.

With additional reference to FIGS. 38-42, another exemplary embodiment of a horticultural container is shown at reference numeral 100. The horticultural container 100 includes a planter body 102 and two legs 105a and 105b. The planter body 102 has four sides 103, an open top 104, and is rectangular in overall shape. In the illustrated embodiment, the legs 105a and 105b form a chamber 106 for a growing medium (e.g. soil) and plants. The growing medium and plants are not shown in the appended drawing figures. Each leg is attached to a removable connecting device 107, also forming part of the horticultural container 100. The planter body 102 may have other shapes and/or more than four sides 103. For example, the side(s) may form an oval or a circle. The legs 105a and 105b may be removable from the planter body 102.

Figure 40:
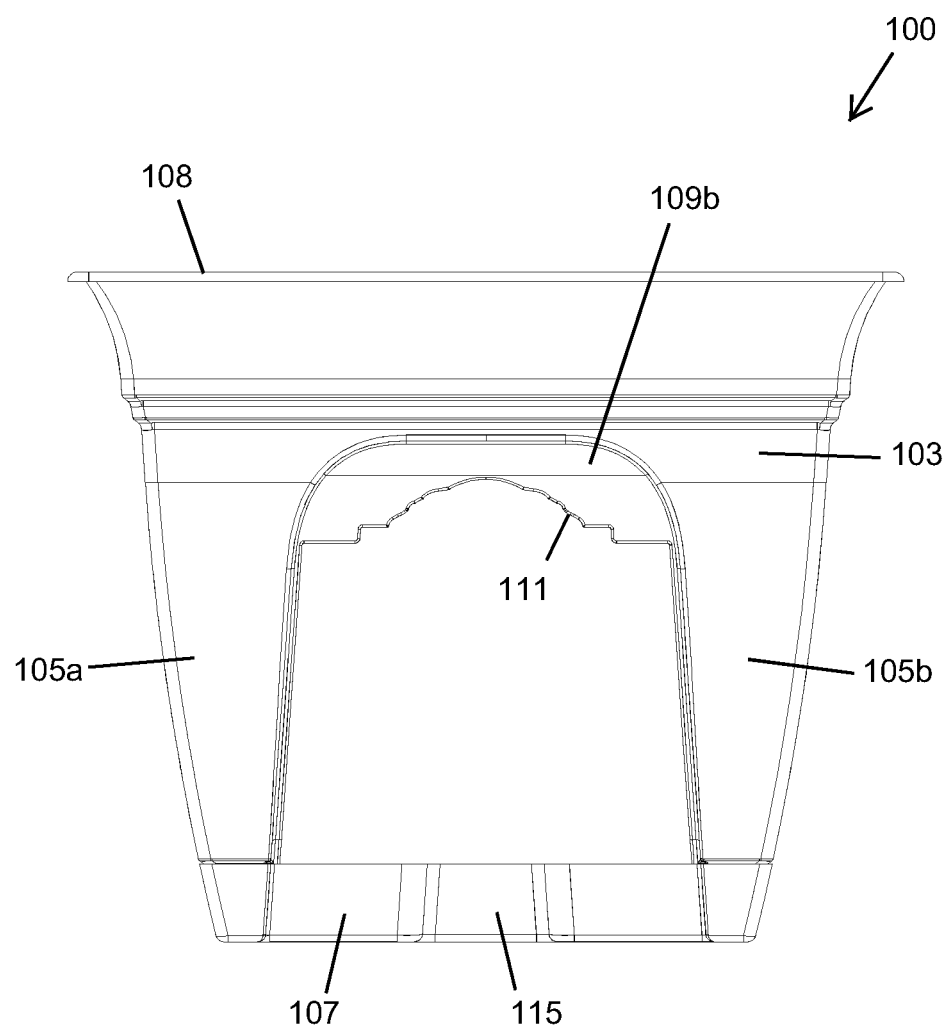
FIG. 40 is a left side view of the horticultural container, the right side view being a mirror image thereof.
Figure 41:
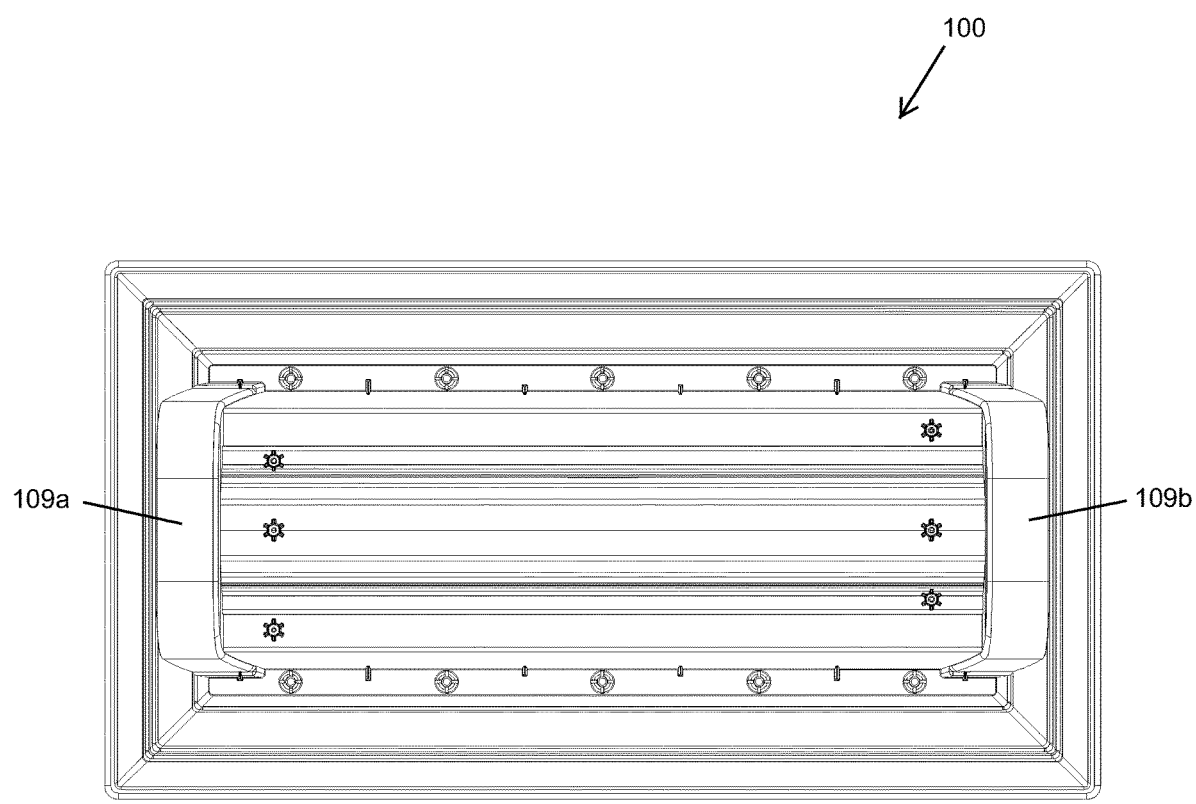
FIG. 41 is a top view of the horticultural container.
Figure 42:
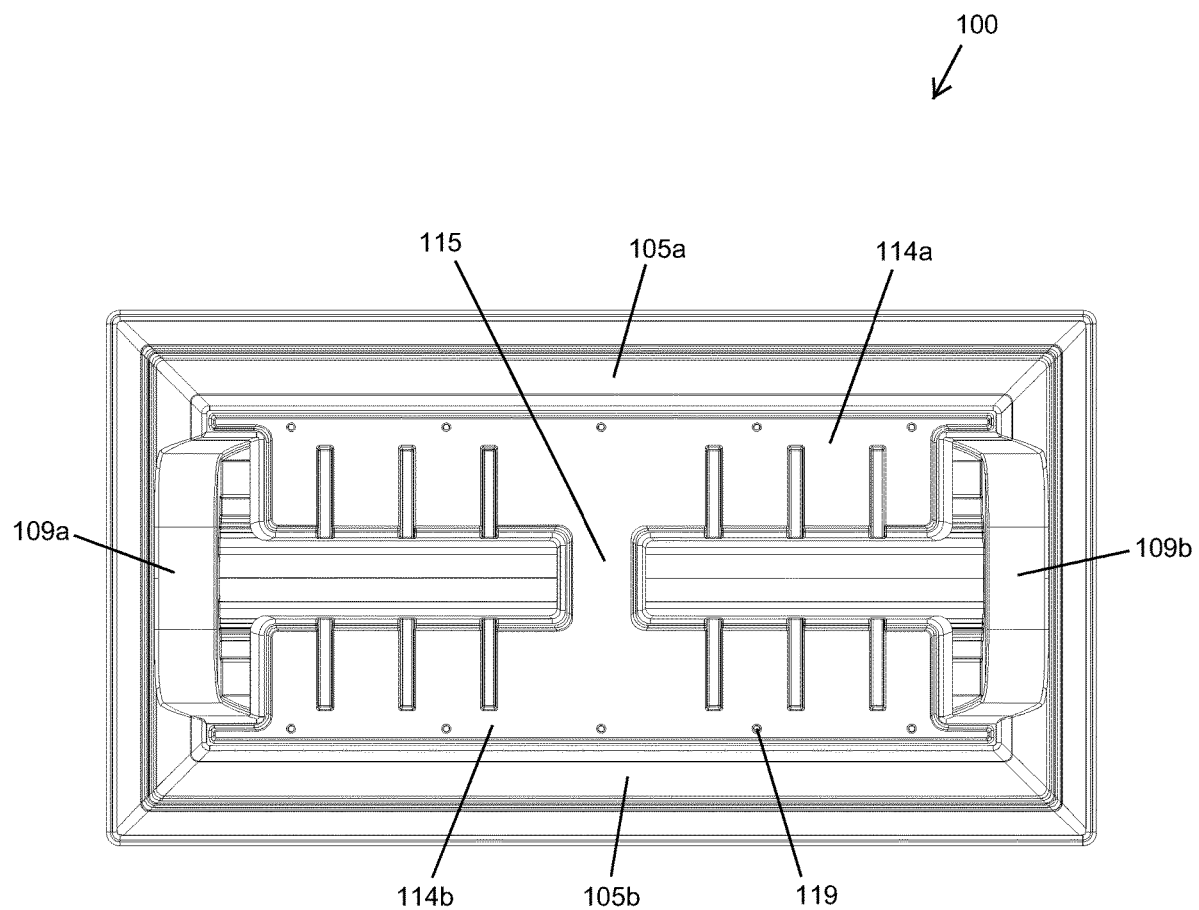
FIG. 42 is a bottom view of the horticultural container.

The planter body 102 includes an upper rim 108, handles 109a and 109b, and a stepped bottom wall 111. The stepped bottom wall 111 may be shaped to accommodate a variety of top rails 70 of a railing 72. For example, the stepped bottom 111 may be shaped to accommodate a flat top rail 72, or, as shown in FIG. 40, the stepped bottom 111 may be shaped to accommodate a curved top rail 72. The upper rim 108 and four sides 103 form the chamber and may include a decorative feature. The handles 109a and 109b are formed from a recess in two sides 103 of the planter body 102.

With additional reference to FIGS. 26-31, the horticultural container 20 is secured to top rail 70 of a railing 72. Although the container 20 is shown secured to the railing 72, the containers 10, 80, and 100 may be secured to a railing in the same manner. Since the container 10 is more elongated than the container 20 and container 80, the container 10 and container 100 may overlap with more balusters 71 of the railing 72 than the container 20 and container 80. The steps at the bottom 31 of the planter body 22 are shaped to cooperate with a variety of top rail 70 shapes and sizes. The planter body 22 has a longitudinal axis that is parallel to the top rail 70 of a railing.

The legs 25a and 25b are tapered, hollow, and are oriented on opposite sides of the top rail 70 of a railing 72. The legs 25a and 25b are tapered to facilitate nesting and stacking of multiple containers. The legs 25a and 25b are hollow and similarly shaped and sized to allow for the planting and root growth of a plant down each leg 25a and 25b to counterbalance the horticulture container 20. The spacing between each leg 25a and 25b is wide enough to fit a top rail 70 of a railing 72, and the width w1 of a baluster 71, between each leg 25a and 25b.

In FIGS. 1-20, and 33-42 the legs 5a and 5b, 25a and 25b, 85a and 85b, and 105a and 105b are shown as being monolithic with the planter body 2, 22, 82, and 102 respectively. Here, the legs and body are made from one uniform piece of polymer, such as by injection molding. However, the legs 5a and 5b, 25a and 25b, 85a and 85b, and 105a and 105b may also be separable from the respective planter body 2, 22, 82, and 102, and may be made of different materials than the planter body 2, 22, 82, and 102, respectively. The hollow chambers of the legs 5a and 5b, 25a and 25b, 85a and 85b, and 105a and 105b are continuous with the respective chamber, 6, 26, 86, and 106, and form an interior volume, as illustrated in FIGS. 1-20, and 33-42. In another example, the legs each may form a separate chamber from the plant body.

The legs 25a and 25b are detachably connected to a connecting device 27. FIGS. 21-25 illustrate an exemplary connecting device detached from the legs 25a and 25b in isolation. The connecting device 27 includes a chamber 32 with an open top 33, and is shaped to receive at least one baluster 71 of a railing 72. The connecting device 27 has a longitudinal axis that is parallel to the planter body 22 and top rail 70 of the railing 72.

The attachment of the connecting device 27 to the legs 25a and 25b may be made by a snap fit, friction fit, interference fit, or other fastenerless technique. With reference to FIGS. 15-20, the legs 25a and 25b have holes with an entrance 41, and an exit 30. Each hole may be configured to receive and secure a coordinating protrusion 40 of the connecting device 27. Each protrusion 40 may have one or more detents 42. When the protrusion 40 enters the hole 41 and the detent 42 passes the bottom wall of the leg, the edge of the hole 30 is located below the detent 42, thus securing the bottom wall between the detent and the connecting device.

With reference to FIGS. 21-25 an example protrusion 40, such as a bayonet, has opposing ends, where the protrusion 40 extends upward from the bottom wall of the connecting device 27, into the chamber 32. When the bottoms of the legs 25a and 25b are received into coordinating regions of the chamber 32, and the protrusions 40 are forced through the holes 41 of the legs 25a and 25b, the protrusions 40 will matingly connect with the legs 25a and 25b. A detent 42b surrounding the protrusions 40 will deflect resilient edges of the holes 41, and once past the bottom wall of the legs, will secure the connecting device 27 to the legs 25a and 25b. The holes may have reliefs to facilitate the connecting and disconnecting of the connecting device 27 to and/or from the legs 25a and 25b.

The connecting device 27 is continuous from leg 25a to leg 25b. The connecting device has a first arm 34a and a second arm 34b, where the first arm 34a is detachably connected to the first leg 25a, and the second arm 34b is detachably connected to the second leg 25b. The first arm 34a and the second arm 34b are parallel to one another and parallel to the longitudinal axis. A width w2 of the connecting device 27 traversing the longitudinal axis is likely to be too extensive in measurement to fit between balusters 71 of most railings 72 in a horizontal orientation. However, the width w2 of the connecting device 72 is smaller in measurement than the height w3 of a baluster 71, and the height w4 of the connecting device 27 is small enough in measurement to allow for the connecting device 27 to be turned vertically to fit between two adjacent balusters 71. In this way, the connecting device 27 may be slid into the space between two adjacent balusters and the top rail 70 of the railing 72. From here, the connecting device 27 may be turned back to again have its longitudinal axis parallel to the railing 72, so that at least one baluster becomes trapped between the first arm 34a and second arm 34b.

Once the longitudinal axis of the connecting device 27 is parallel to the railing 72, the legs 25a and 25b are secured to the connecting device 27. For instance, the legs 25a and 25b are pressed onto the top of the connecting device, so that the protrusions 40 enter the holes 41 of the legs 25a and 25b and lock the connecting device 27 to the legs 25a and 25b. Other fastening techniques or members may be used such as, but not limited to, the fastenerless connections mentioned above, clips, threaded fasteners, push-in plugs, etc.

Connecting the first arm 34a and second arm 34b is a member 35 transverse to the connecting device's longitudinal axis. After the connecting device 27 is turned back horizontally, the member 35 is located between two balusters 71 of a railing 72. The member 35 is perpendicularly attached to a first side of the first arm 34a, and perpendicularly attached to a first side of the second arm 34b.

In FIGS. 21-35, the member 35, is illustrated as being monolithic with the first arm 34a and the second arm 34b. Here, the connecting device 27, including the first arm 34a, and the second arm 34b, is made from one uniform piece of polymer, such as by injection molding. However, the arms 34a and 34b may also be separable and/or made of a different material from the member 35. The connecting device 27 may be made of different materials than the planter body 22.

The connecting device 27 may include a hollow chamber 32, with an open top 33. The hollow chamber 32 forms an interior volume, as illustrated in FIGS. 1-20. The hollow chamber 32 may be continuous with the first arm 34a, the first leg 34b, and the member 35, as depicted in FIGS. 1-20. In another example, the arms 34a and 34b, and member 35, may form a separate chambers within the connecting device 27.

The reservoir formed by side and bottom walls of the connecting device 27 can hold water and may be used as a self watering device for a plant contained in planter body 22 and legs 25a and 25b. The connecting device 27 may be considered a tray or a saucer for the planter body 22 and legs 25a and 25b. Alternatively, the connecting device may have drainage holes.

The first arm 34a and second arm 34b contain elongated protrusions 36 for strengthening the connecting device 27 that are attached to a bottom wall of the connecting device 27.

FIGS. 21-25 further illustrate notch 38 on either side of the member 35 and between the arms 34a and 34b. The notches 38 respectively receive the balusters between which the connecting device is positioned. The connecting device 27 may have two notches 38, as illustrated in FIGS. 21-25, may have one notch 38, or may have more than two notches 38. The member 35, first arm 34a, and second arm 34b form the shape of the notch 38, which is at least as wide as the width w1 of the baluster 71.

Although certain embodiments have been shown and described, it is understood that equivalents and modifications falling within the scope of the appended claims will occur to others who are skilled in the art upon the reading and understanding of this specification.

What is claimed is:

1. A horticultural container assembly, comprising:
   a planter body defining a chamber, wherein the planter body has an open top;
   a first leg and a second leg, each extending downward from the planter body, and spaced and shaped to straddle a top rail of a railing; and
   a connecting device configured to attach to each of the first and second legs by extending through a passage between adjacent balusters of the railing, wherein the connecting device has a longitudinal axis, and is comprised of at least a first arm and a second arm, wherein the first and second arms are interconnected by a member traversing the longitudinal axis; and
   wherein the first and second arms are spaced to receive at least one baluster of the railing therebetween, and form at least one notch with the member traversing the longitudinal axis.

2. The horticultural container assembly according to claim 1, wherein the planter body, first leg, and second leg are monolithic.

3. The horticultural container assembly according to claim 1, wherein the first leg and second leg are hollow and the hollow legs combine with the planter body to form an interior volume of the horticultural container.

4. The horticultural container assembly according to claim 1, wherein the notch is configured to trap at least one baluster of the railing between the arms.

5. The horticultural container assembly according to claim 1, further comprising at least one of a growing medium or a plant located within the chamber.

6. The horticultural container assembly according to claim 1, wherein a distance between the first and second legs is spaced to fit both a top rail and a top of a baluster.

7. The horticultural container assembly according to claim 1, wherein the connecting device is continuous from the first leg to the second leg.

8. The horticultural container assembly according to claim 1, wherein the connecting device is separable from the first leg and the second leg.

9. The horticultural container assembly according to claim 1, wherein the connecting device is connected to the first leg and the second leg by snap fit, friction fit, interference fit, or fastenerless connection.

10. The horticultural container assembly according to claim 1, wherein the first arm, the second arm, and the member are monolithic.

11. The horticultural container assembly according to claim 1, wherein the first arm is perpendicularly connected to a first side of the member, and the second arm is perpendicularly connected to a second side of the member.

12. The horticultural container assembly according to claim 1, wherein the connecting device comprises a water reservoir with an open top fluidly connected with the chamber of the planter body.

13. The horticultural container assembly according to claim 1, wherein the first leg and second leg have holes at a bottom end of each respective leg, the connecting device is capable of holding liquid, and the liquid is capable of passing from the connecting device into the first and second leg through the holes at the bottom of each leg.

14. A railing-mountable horticultural container assembly, comprising: a planter having a planter body with an open top, a first leg, and a second leg, each of the first leg and the second leg extending downward from respective sides of the planter body, and the first leg and the second leg spaced apart to straddle a top rail of a railing, and wherein lower ends of each of the first leg and the second leg has a first fastener part; and a connecting device configured to retain the planter to the railing, the connecting device having a first arm and a second arm that are spaced apart to receive a baluster of the railing therebetween and the connecting device having a member extending below the top rail and between and connected to each of the first arm and the second arm, wherein:

the first arm, the second arm, and the member are monolithic in construction, each of the first arm and the second arm has a second fastener part, and the second fastener part of the first arm mates with the first fastener part of the first leg and the second fastener part of the second arm mates with the first fastener part of the second leg to attach the connecting device to the planter.

15. The railing-mountable horticultural container assembly according to claim 14, wherein the planter body, the first leg, and the second leg are monolithic.

16. The railing-mountable horticultural container assembly according to claim 14, wherein the connecting device is detachable from the first leg and the second leg.

17. The railing-mountable horticultural container assembly according to claim 14, wherein each mating pair of the first fastener part and the second part form a snap fit, a friction fit, an interference fit, or a fastenerless connection.

18. The railing-mountable horticultural container assembly according to claim 14, wherein the connecting device comprises a water reservoir that retains water in each of the first arm, the second arm, and the member below the top rail.

19. The railing-mountable horticultural container assembly according to claim 18, wherein the water reservoir receives water that drains from the planter.

20. The railing-mountable horticultural container assembly according to claim 18, wherein the water reservoir is fluidly coupled with the planter to supply water to the planter.

* * * * *